United States Patent
Ohmura et al.

(10) Patent No.: US 10,944,798 B2
(45) Date of Patent: *Mar. 9, 2021

(54) COMMUNICATION TERMINAL, IMAGE COMMUNICATION SYSTEM, AND DISPLAY CONTROL METHOD

(71) Applicant: Ricoh Company, Ltd., Tokyo (JP)

(72) Inventors: Yohhei Ohmura, Kanagawa (JP); Kenichiro Morita, Tokyo (JP); Takafumi Takeda, Tokyo (JP); Hidekuni Annaka, Saitama (JP); Takeshi Homma, Kanagawa (JP); Mayu Hakata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,391

(22) Filed: May 12, 2020

(65) Prior Publication Data

US 2020/0274904 A1 Aug. 27, 2020

Related U.S. Application Data

(63) Continuation of application No. 16/355,762, filed on Mar. 17, 2019, now Pat. No. 10,686,848.

(30) Foreign Application Priority Data

Mar. 30, 2018 (JP) .............................. JP2018-068440

(51) Int. Cl.
*H04L 29/06* (2006.01)
*H04N 7/15* (2006.01)

(52) U.S. Cl.
CPC .... *H04L 65/1059* (2013.01); *H04L 29/06414* (2013.01); *H04L 65/1066* (2013.01); *H04L 65/403* (2013.01); *H04N 7/15* (2013.01)

(58) Field of Classification Search
CPC .......... H04N 7/15; H04N 7/147; H04N 7/157; H04N 5/225; H04N 5/23219; H04N 5/265;

(Continued)

(56) References Cited

U.S. PATENT DOCUMENTS 5,751,337 A * 5/1998 Allen ...................... H04M 3/56
348/14.07
6,449,011 B1 * 9/2002 Muramatsu .............. H04N 7/15
348/169

(Continued)

FOREIGN PATENT DOCUMENTS

| JP | 2011-223076 | 11/2011 |
| JP | 2012-156820 | 8/2012 |
| JP | 2012-178135 | 9/2012 |

OTHER PUBLICATIONS

U.S. Appl. No. 16/103,344, filed Aug. 14, 2018, Mayu Hakata, et al.

(Continued)

*Primary Examiner* — Negussie Worku
(74) *Attorney, Agent, or Firm* — Xsensus LLP

(57) ABSTRACT

An image communication system includes a first communication terminal including first circuitry and a second communication terminal including second circuitry. The first circuitry of the first communication terminal transmits, to the second communication terminal, first image data representing a first image and second image data representing a second image. The first circuitry of the first communication terminal transmits, to the second communication terminal, position information indicating a predetermined position on the first image. The second circuitry of the second communication terminal combines, based on the position information, the second image with the first image at the predetermined position on the first image to generate a combined (Continued)

image. The second circuitry of the second communication terminal displays, on a display, the combined image.

8 Claims, 30 Drawing Sheets

(58) Field of Classification Search
CPC ........ H04N 7/142; H04N 7/183; H04N 7/185; G01B 11/24; G06K 9/00255; G06K 9/4614; G06T 11/60; G06T 13/205; G06T 13/40; G06T 2200/24; G06T 3/60; G06T 7/70; H04L 65/403; H04L 65/602; H04L 65/604; H04L 65/1059; H04L 65/1066; H04L 29/06414; H04L 65/1089; H04M 3/56; H04M 3/567
USPC ...................................................... 358/1.15
See application file for complete search history.

(56) References Cited

U.S. PATENT DOCUMENTS

| | | | |
|---|---|---|---|
| 9,424,678 B1* | 8/2016 | Enakiev | H04N 7/157 |
| 9,967,518 B2* | 5/2018 | Mukai | G06T 7/70 |
| 10,686,848 B2* | 6/2020 | Ohmura | H04L 65/1059 |
| 2004/0223292 A1 | 11/2004 | Murphy | |
| 2005/0021625 A1 | 1/2005 | Fujimura et al. | |
| 2011/0234640 A1* | 9/2011 | Ishida | H04N 5/23238 345/671 |
| 2012/0092715 A1* | 4/2012 | Kamei | G06F 3/1228 358/1.15 |
| 2014/0152764 A1* | 6/2014 | Kira | G01C 21/3647 348/36 |
| 2014/0240448 A1 | 8/2014 | Kanda et al. | |
| 2015/0082359 A1 | 3/2015 | Kuba et al. | |
| 2016/0150023 A1 | 5/2016 | Umehara et al. | |
| 2017/0052757 A1* | 2/2017 | Kanda | G09G 5/14 |
| 2018/0097682 A1* | 4/2018 | Yoshida | H04L 65/1089 |
| 2018/0098105 A1 | 4/2018 | Morita et al. | |
| 2018/0191787 A1 | 7/2018 | Morita et al. | |
| 2018/0198983 A1 | 7/2018 | Fakuya et al. | |
| 2018/0227457 A1 | 8/2018 | Morita et al. | |
| 2019/0206004 A1 | 7/2019 | Shelton, IV et al. | |
| 2019/0306201 A1* | 10/2019 | Ohmura | H04L 65/1059 |
| 2020/0045230 A1 | 2/2020 | Ohmura et al. | |
| 2020/0045244 A1 | 2/2020 | Ohmura et al. | |

OTHER PUBLICATIONS

U.S. Appl. No. 16/131,373, filed Sep. 14, 2018, Takuya Soneda, et al.
U.S. Appl. No. 16/140,945, filed Sep. 25, 2018, Yohhei Ohmura, et al.

* cited by examiner

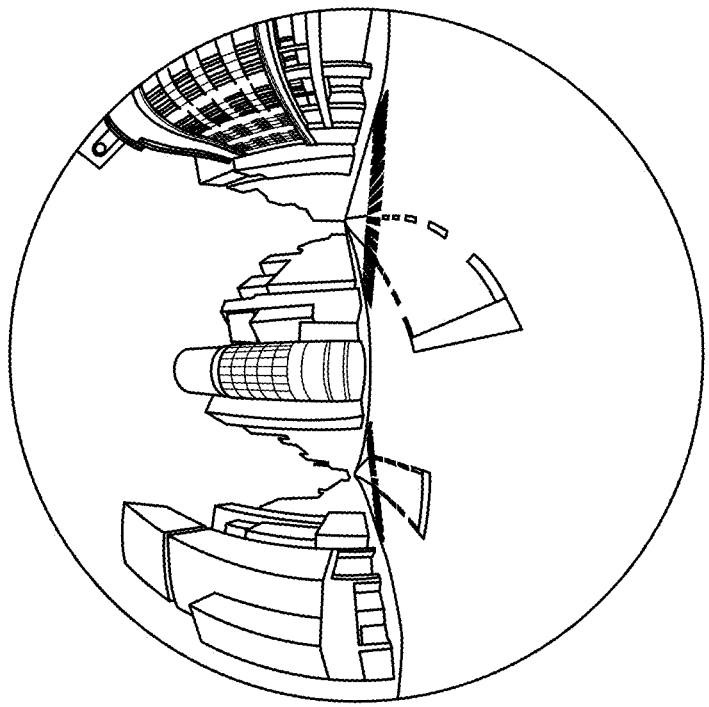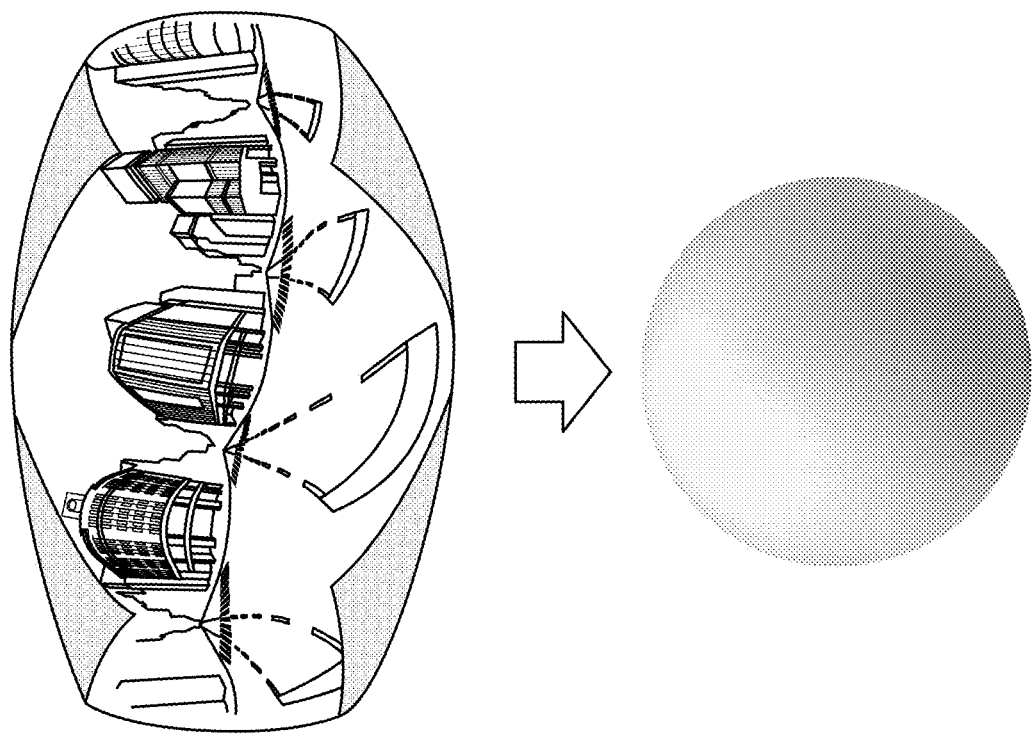

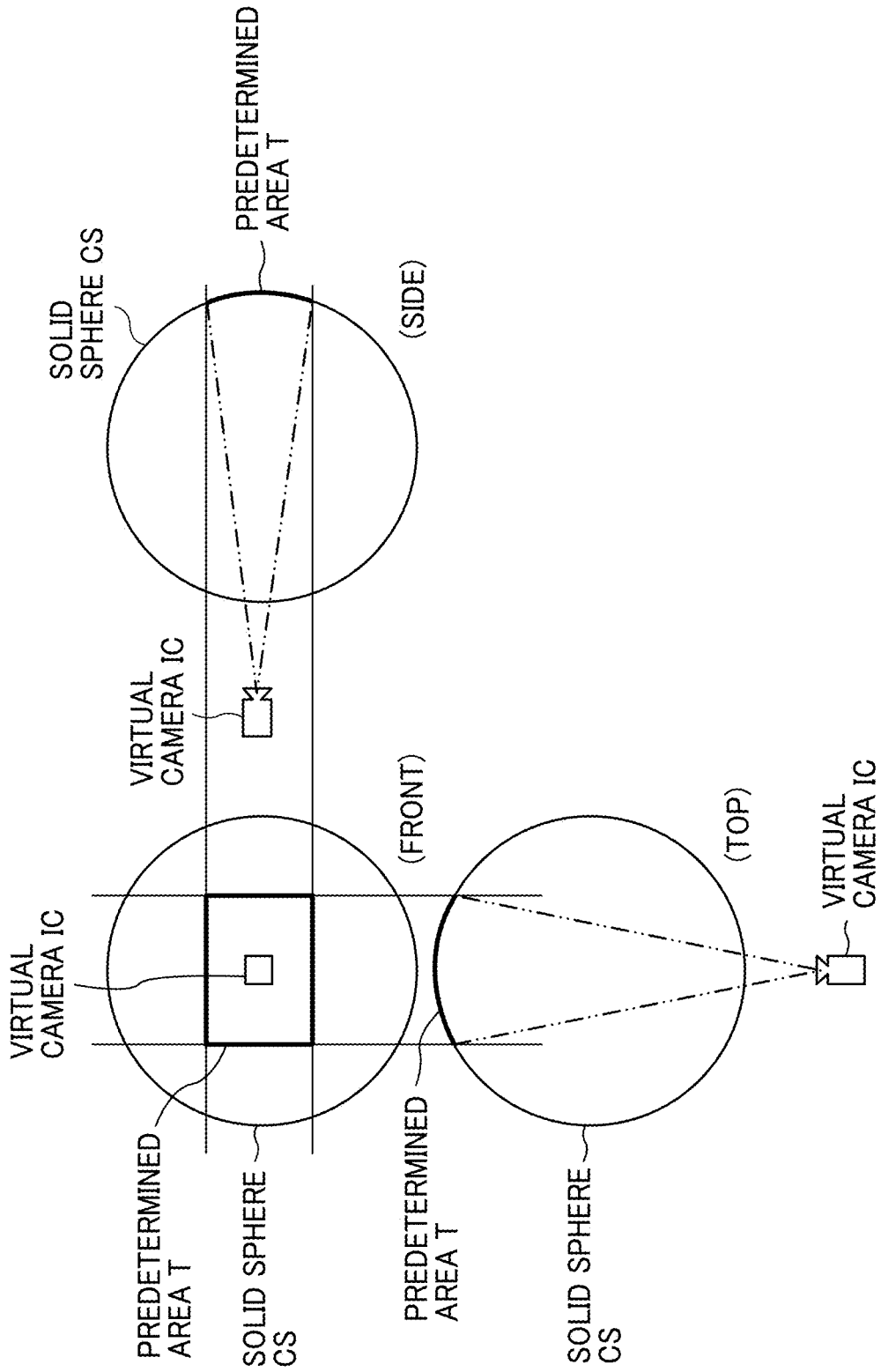

FIG. 16

| IMAGE DATA ID | IP ADDRESS OF TRANSMISSION SOURCE TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |

FIG. 17

| VENDER ID AND PRODUCT ID OF IMAGE CAPTURING DEVICE |
|---|
| vid_05ca&pid_2711 |
| vid_05ca&pid_3822 |
| ... |

FIG. 18

| IP ADDRESS OF IMAGE TRANSMISSION SOURCE | IP ADDRESS OF IMAGE TRANSMISSION SOURCE (IP ADDRESS OF TRANSMISSION SOURCE OF PREDETERMINED AREA INFORMATION) | PREDETERMINED AREA INFORMATION | | |
|---|---|---|---|---|
| | | RADIUS (r) | POLAR ANGLE (θ) | AZIMUTH ANGLE (φ) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 19

| ID ADDRESS OF TRANSMISSION SOURCE TERMINAL | START POINT COORDINATE | END POINT COORDINATE |
|---|---|---|
| 1.2.1.3 | (200, 100) | (840, 580) |
| 1.2.2.3 | (300, 200) | (940, 680) |
| ... | ... | ... |

FIG. 21

| SESSION ID | IP ADDRESS OF PARTICIPANT COMMUNICATION TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

FIG. 22

| SESSION ID | IMAGE DATA ID | IP ADDRESS OF TRANSMISSION SOURCE TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

FIG. 23

| IP ADDRESS OF IMAGE TRANSMISSION SOURCE | IP ADDRESS OF IMAGE TRANSMISSION DESTINATION | PREDETERMINED AREA INFORMATION | | |
|---|---|---|---|---|
| | | RADIUS (r) | POLAR ANGLE (θ) | AZIMUTH ANGLE (φ) |
| 1.2.1.3 | 1.2.2.3 | 10 | 20 | 30 |
| 1.2.1.3 | 1.2.2.3 | 20 | 30 | 40 |
| 1.2.1.3 | 1.2.2.3 | ... | ... | ... |
| 1.2.2.3 | 1.2.1.3 | ... | ... | ... |
| 1.2.2.3 | 1.2.1.3 | ... | ... | ... |
| ... | ... | | | |

COMMUNICATION TERMINAL, IMAGE COMMUNICATION SYSTEM, AND DISPLAY CONTROL METHOD

CROSS-REFERENCE TO RELATED APPLICATION

This patent application is a continuation of U.S. application Ser. No. 16/355,762, filed Mar. 17, 2019, which claims priority pursuant to 35 U.S.C. § 119(a) to Japanese Patent Application No. 2018-068440, filed Mar. 30, 2018, in the Japan Patent Office, the entire disclosure of each is hereby incorporated by reference herein.

BACKGROUND

Technical Field

Embodiments of the present disclosure relate to a communication terminal, an image communication system, and a display control method.

Related Art

Remote conference systems, such as videoconference systems, are now in widespread use, enabling users to remotely attend a conference (meeting) that is held among different sites via a communication network such as the Internet. In such videoconference systems, a communication terminal for a remote conference system is provided in a conference room (meeting room) where attendees of one party in a remote conference are attending. This communication terminal collects an image or video of the conference room including the attendees and sounds such as a speech made by an attendee, and transmits digital data converted from the collected image (video) and/or sounds to the other party's terminal provided at a different conference room. Based on the transmitted digital data, the other party's terminal displays images on a display or outputs audio from a speaker in the different conference room to establish video communication (video call). This enables the attendees to carry out the conference among remote sites, as if they are close to each other as an actual conference.

In addition, an image capturing device that is capable of capturing a spherical image in real time is connectable to such communication terminals described above to transmit the spherical image acquired by the image capturing device to each communication terminal of the other party. Each communication terminal sequentially converts the received spherical image to a planar image representing a predetermined area, which is a part of the spherical image, and displays the planar image on a display. This enables a user in each of remote sites to determine, by his or her own, a predetermined area image to be displayed, representing an image of a predetermined area that the user is interested in, from a whole image of the spherical image.

In addition, there is a known technique that superimposes a predetermined figure on an object in a video image indicated by a video image communication terminal in superimposing the figure on the video image by an image relay server that relays a video image between or among two or more video image communication terminals. This provides a video image in which the figure is combined with the object in the video image even when objects in the video image moves.

SUMMARY

An exemplary embodiment of the present disclosure includes an image communication system including a first communication terminal and a second communication terminal. The first communication terminal includes first circuitry and a second communication terminal includes second circuitry. The first circuitry of the first communication terminal transmits, to the second communication terminal, first image data representing a first image and second image data representing a second image. The first circuitry of the first communication terminal transmits, to the second communication terminal, position information indicating a predetermined position on the first image. The second circuitry of the second communication terminal combines, based on the position information, the second image with the first image at the predetermined position on the first image to generate a combined image. The second circuitry of the second communication terminal displays, on a display, the combined image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4A is an illustration of a Mercator image covering a sphere, according to an embodiment of the present disclosure;

FIG. 4B is an illustration of a spherical image, according to an embodiment of the present disclosure;

FIG. 5 is an illustration of relative positions of a virtual camera and a predetermined area in a case where a spherical image is represented as a three-dimensional solid sphere, according to an embodiment of the present disclosure;

FIG. 16 is a conceptual diagram illustrating an image type management table, according to an embodiment of the present disclosure;

FIG. 17 is a conceptual diagram illustrating an image capturing device management table, according to an embodiment of the present disclosure;

FIG. 18 is a conceptual diagram illustrating a predetermined area management table, according to an embodiment of the present disclosure;

FIG. 19 is a conceptual diagram illustrating a combined position management table according to an embodiment of the present disclosure;

FIG. 21 is a conceptual diagram illustrating a session management table, according to an embodiment of the present disclosure;

FIG. 22 is a conceptual diagram illustrating an image type management table, according to an embodiment of the present disclosure;

FIG. 23 is a conceptual diagram illustrating a predetermined area management table, according to an embodiment of the present disclosure;

Figure 1:
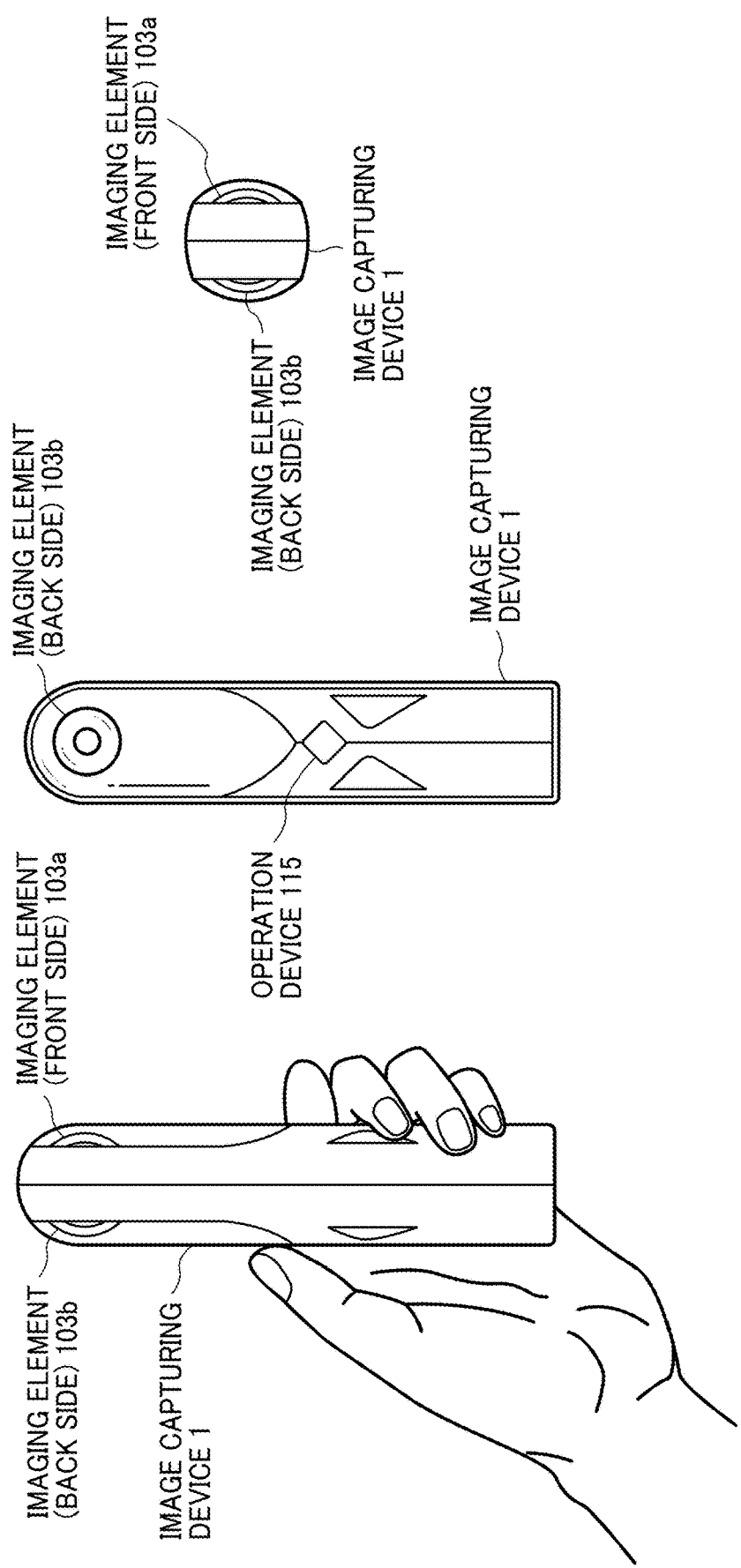
FIG. 1A is a left side view of an image capturing device according to an embodiment of the present disclosure.
FIG. 1B is a front view of an image capturing device according to an embodiment of the present disclosure.
FIG. 1C is a plan view of an image capturing device according to an embodiment of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of one of the embodiments of the present disclosure, with reference to the attached drawings, FIG. 1 (FIG. 1A to FIG. 1C) to FIG. 35.

Overview of Embodiment

Method of Generating Spherical Image

A method of generating a spherical image is described below, with reference to FIG. 1 (FIG. 1A to FIG. 1C) to FIG. 7.

A description is now given of an external view of an image capturing device 1, with reference to FIG. 1A to FIG. 1C. The image capturing device 1 is a digital camera that captures an image (captured image) representing a three dimensional spherical (360-degree) image. FIG. 1A, FIG. 1B, and FIG. 1C are a left side view, a front view, and a plan view, respectively, of the image capturing device 1.

As illustrated in FIG. 1A, the image capturing device 1 can be held by a single hand. Referring to FIG. 1A, FIG. 1B, and FIG. 1C, the image capturing device 1 is provided with an imaging element 103a on a front side (anterior side) and an imaging element 103b on a back side (rear side) in an upper section. The imaging elements (image sensors) 103a and 103b are used in combination with optical members such as fisheye lenses 102a and 102b each of which is capable of capturing a hemispherical image having a field view of 180-degree or wider. A detailed description of the fisheye lenses 102a and 102b is deferred. As illustrated in FIG. 1B, the image capturing device 1 is also provided with an operation device 115 such as a shutter button on an opposite side of the front side.

Figure 2:
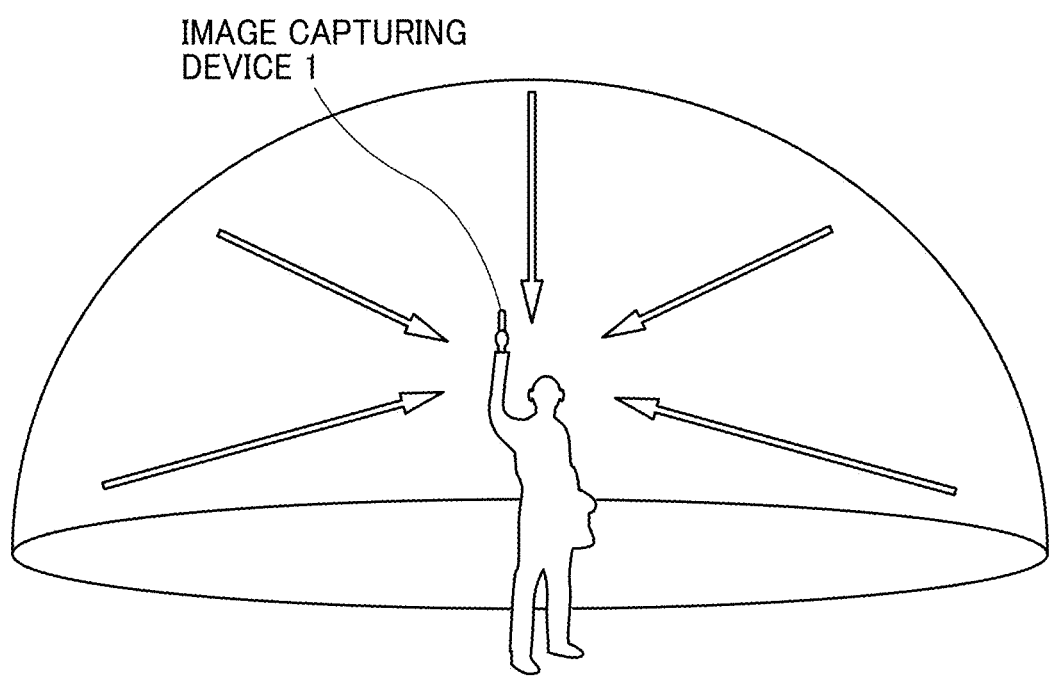
FIG. 2 is an illustration of how a user uses an image capturing device according to an embodiment of the present disclosure.

A description is now given of an example of how the image capturing device 1 is used, with reference to FIG. 2. FIG. 2 is an illustration of an example of how a user uses the image capturing device 1. As illustrated in FIG. 2, the image capturing device 1 is used for capturing objects surrounding the user who is holding the image capturing device 1 in his or her hand, for example. The imaging elements 103a and 103b illustrated in FIG. 1A to FIG. 1C capture the objects surrounding the user to obtain two hemispherical images.

Figure 3A:
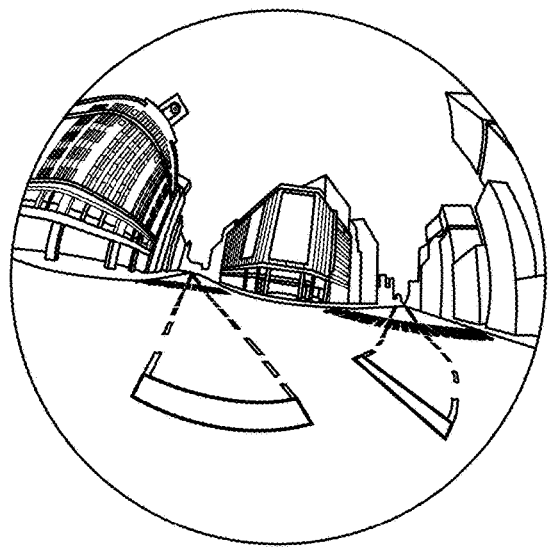
FIG. 3A is an illustration of a front side of a hemispherical image captured by an image capturing device according to an embodiment of the present disclosure.
Figure 3B:
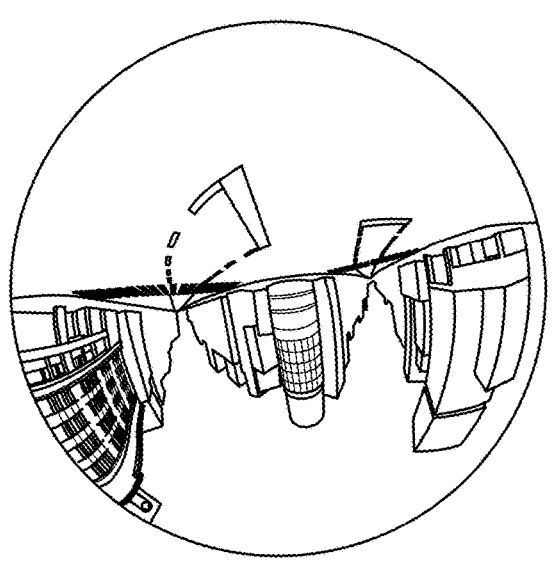
FIG. 3B is an illustration of a back side of a hemispherical image captured by an image capturing device according to an embodiment of the present disclosure.
Figure 3C:
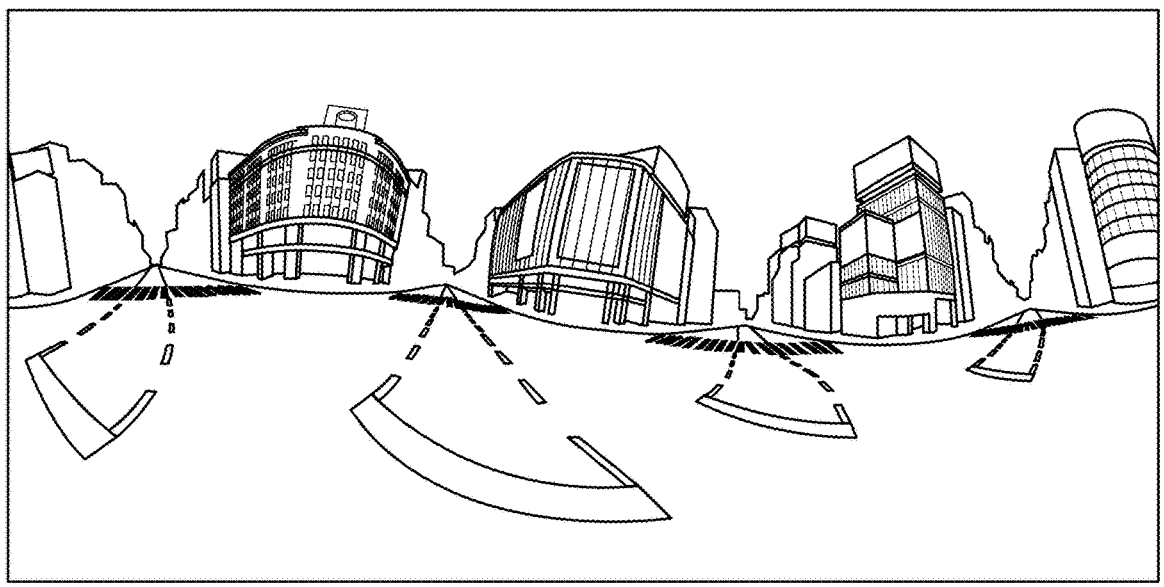
FIG. 3C is an illustration of an image captured by an image capturing device represented by Mercator projection, according to an embodiment of the present disclosure.

A description is now given of an overview of a process of generating a spherical image from the images captured by the image capturing device 1, with reference to FIG. 3 (FIG. 3A to FIG. 3C) and FIG. 4 (FIG. 4A and FIG. 4B). FIG. 3A is an illustration of one of the two hemispherical images (front side), captured by the image capturing device 1. FIG. 3B is an illustration of the other one of the two hemispherical images (back side), captured by the image capturing device 1. FIG. 3C is an illustration of an image represented by Mercator projection. The image represented by Mercator projection as illustrated in FIG. 3C is, hereinafter, referred to as a "Mercator image". FIG. 4A is an illustration of a Mercator image covering a sphere. FIG. 4B is an illustration of a spherical image.

As illustrated in FIG. 3A, an image captured by the imaging element 103a is a curved hemispherical image (front side) due to the fisheye lens 102a, which is described later. In addition, as illustrated in FIG. 3B, an image captured by the imaging element 103b is a curved hemispherical image (back side) captured by the fisheye lens 102b, which is described later. The image capturing device 1 combines one hemispherical image (front side) and the other hemispherical image (back side), which is reversed by 180-degree from the one hemispherical image (front side), to generate the Mercator image as illustrated in FIG. 3C.

The Mercator image is attached so as to cover the sphere surface using Open Graphics Library for Embedded Systems (OpenGL ES) as illustrated in FIG. 4A. This results in the spherical image as illustrated in FIG. 4B. In other words, the spherical image is represented as an image of which the Mercator image faces toward the center of the sphere. OpenGL ES is a graphic library used for visualizing two-dimensional (2D) and three-dimensional (3D) data. The spherical image is either a still image or a video image.

Because the spherical image is an image attached to the sphere surface, a part of the image may look distorted when viewed from the user, and this may give a feeling of strangeness to the user. To cope with this, a part of the spherical image is displayed as a planar image having fewer curves. The part of the spherical image displayed as a planar image is referred to as a predetermined area. In addition, the predetermined area may also be selectable, or settable according to a user instruction. The displayed planar image corresponding the predetermined area is, hereinafter, referred to as a "predetermined area image". A description is now given of displaying the predetermined area image, with reference to FIG. 5 and FIG. 6 (FIG. 6A and FIG. 6B).

FIG. 5 is an illustration of relative positions of a virtual camera IC and the predetermined area T when the spherical image is represented as a three-dimensional solid sphere, according to the present embodiment. The virtual camera IC corresponds to a position of a point of view (viewpoint) of a user who is viewing the full-view spherical image CE represented as a surface area of the three-dimensional solid sphere CS. FIG. 6A is a perspective view of FIG. 5. FIG. 6B is an illustration of the predetermined area image displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is outside of the spherical image CE as illustrated in FIG. 5. The predetermined area T in the spherical image CE is an imaging area of the virtual camera IC. Specifically, the predetermined area T is identified by predetermined area information indicating an imaging direction and an angle of view of the virtual camera IC in a three-dimensional virtual space containing the spherical image CE.

Figure 6A:
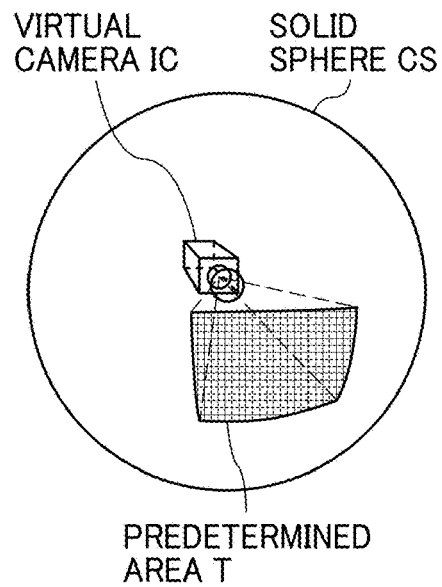
FIG. 6A is a perspective view of FIG. 5.
Figure 6B:
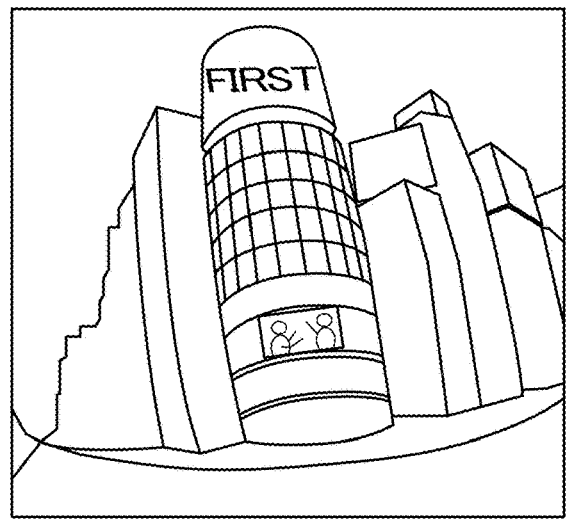
FIG. 6B is an illustration of a predetermined area image displayed on a display of a communication terminal according to an embodiment of the present disclosure.

The predetermined area image Q, which is an image of the predetermined area T illustrated in FIG. 6A, is displayed on a display as an image of an imaging area of the virtual camera IC, as illustrated in FIG. 6B. The image illustrated in FIG. 6B is the predetermined area image represented by the predetermined area information that is set by default. In another example, a predetermined area image may be identified by an imaging area (X, Y, Z) of the virtual camera IC, i.e., the predetermined area T, rather than the predetermined area information, i.e., the position coordinate of the virtual camera IC. In the following description of the embodiment, an imaging direction (rH, rV) and an angle of view a of the virtual camera IC are used.

Figure 7:
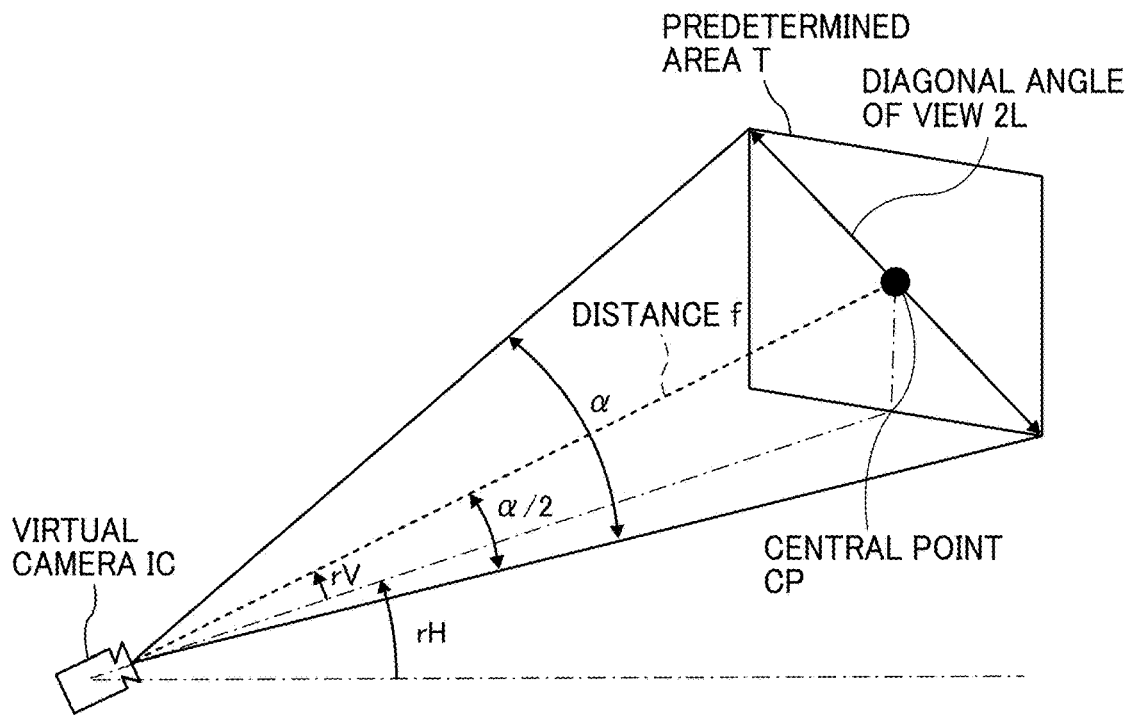
FIG. 7 is a diagram illustrating a relation between predetermined area information and a predetermined area image, according to an embodiment of the present disclosure.

A description is now given of a relation between the predetermined area information and the predetermined area T, with reference to FIG. 7. FIG. 7 is a diagram illustrating a relation between the predetermined area information and the predetermined area T, according to the present embodiment. As illustrated in FIG. 7, "rH", "rV", and "α" denote a horizontal radian, a vertical radian, and an angle of view, respectively, of the virtual camera IC. The position of the virtual camera IC is adjusted, such that the point of gaze of the virtual camera IC, indicated by the imaging direction (rH, rV), matches a center point CP of the predetermined area T, which is the imaging area of the virtual camera IC. The predetermined area image Q is an image of the predetermined area T, in the spherical image CE. Distance "f" denotes a distance from the virtual camera IC to the center point CP of the predetermined area T. L is a distance between the center point CP and a given vertex of the predetermined area T (2L is a diagonal line). In FIG. 7, a trigonometric function equation generally expressed by the following equation 1 is satisfied.

$$L/f = \tan(\alpha/2) \qquad \text{(Equation 1)}$$

Figure 8:
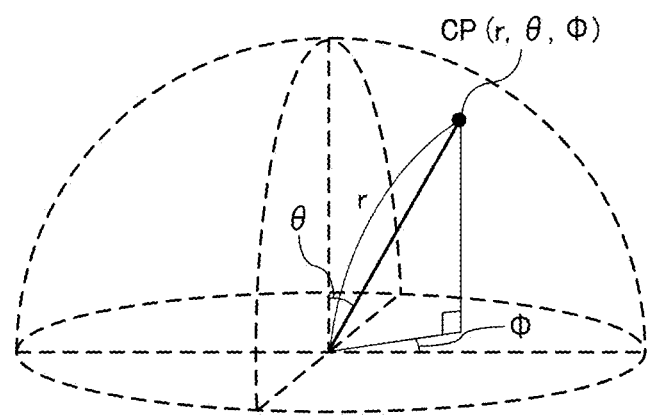
FIG. 8 is a diagram illustrating a point in a three-dimensional Euclidean space according to spherical coordinates, according to an embodiment of the present disclosure.

FIG. 8 is a diagram illustrating a point in a three-dimensional Euclidean space according to spherical coordinates, according to the present embodiment. A positional coordinate (r, θ, φ) is given when the center point CP is represented by a spherical polar coordinates system. The positional coordinate (r, θ, φ) represents a moving radius, a polar angle, and an azimuth angle. The moving radius r is a distance from the origin of the three-dimensional virtual space including the spherical image to the center point CP. Accordingly, the radius r is equal to Distance "f". FIG. 8 illustrates the relation between these items. In the following description of the embodiment, the positional coordinates (r, θ, φ) of the virtual camera IC is used.

Overview of Image Communication System

Figure 9:
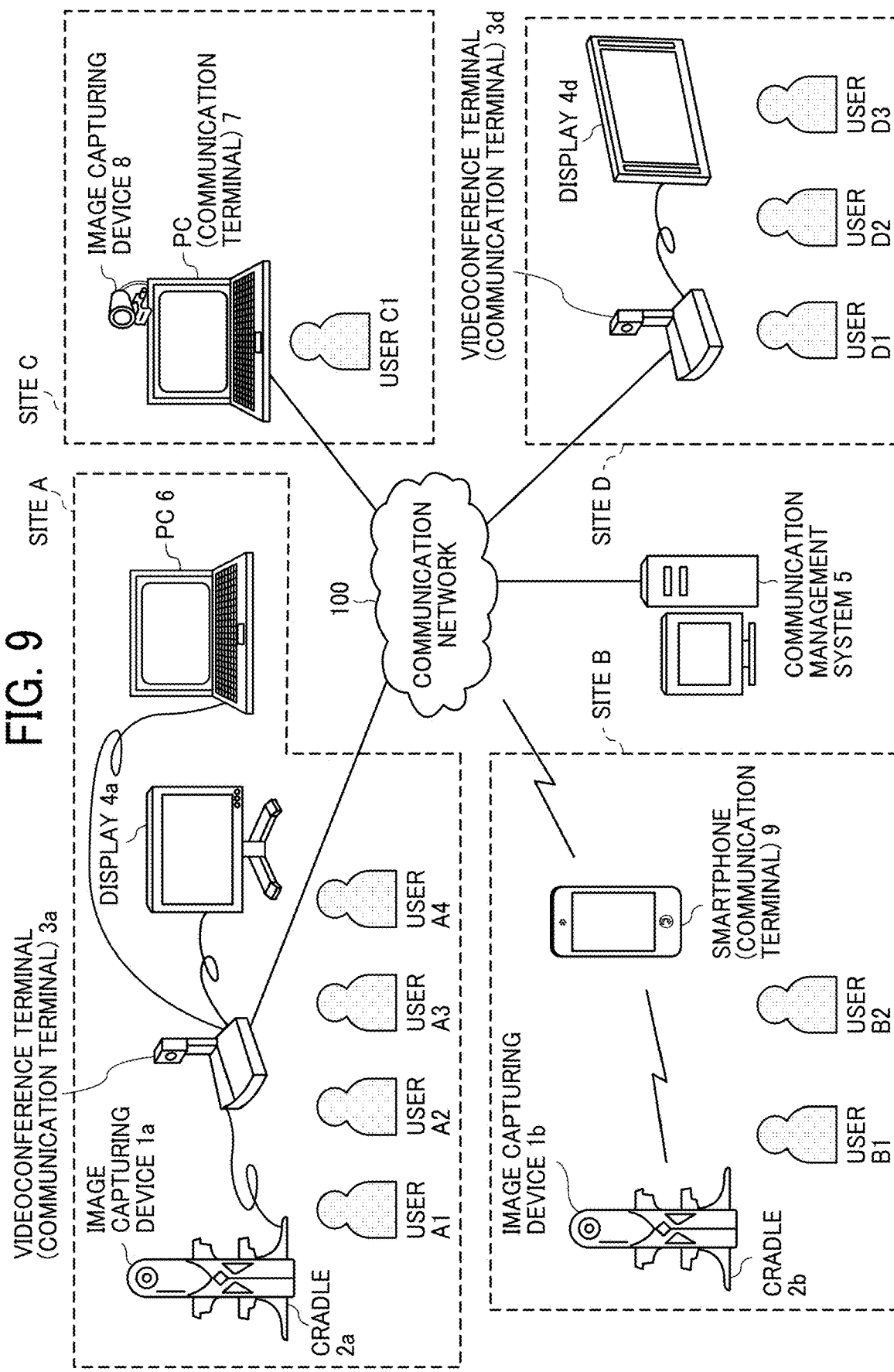
FIG. 9 is a schematic diagram illustrating a configuration of an image communication system according to an embodiment of the present disclosure.

A description is now given of an overview of a configuration of an image communication system according to the present embodiment of the disclosure, with reference to FIG. 9. FIG. 9 is a schematic diagram illustrating a configuration of the image communication system according to the present embodiment.

As illustrated in FIG. 9, the image communication system according to the present embodiment includes an image capturing device 1a, an image capturing device 1b, a videoconference terminal 3a, a videoconference terminal 3d, a display 4a, a display 4d, a communication management system 5, a personal computer (PC) 6, a PC 7, an image capturing device 8, and a smartphone 9. The videoconference terminal 3a, the smartphone 9, the PC 7, and the videoconference terminal 3d communicate data with one another via a communication network 100 such as the Internet. The communication network 100 may be either a wireless network or a wired network.

Each of the image capturing device 1a and the image capturing device 1b is a special digital camera that captures an image including an object or a view (surroundings) to obtain two hemispherical images from which a spherical image is generated, as described above. The image capturing device 8 is a general-purpose digital camera that captures an image of an object or a view (surroundings) to obtain a general planar image.

Figure 11:
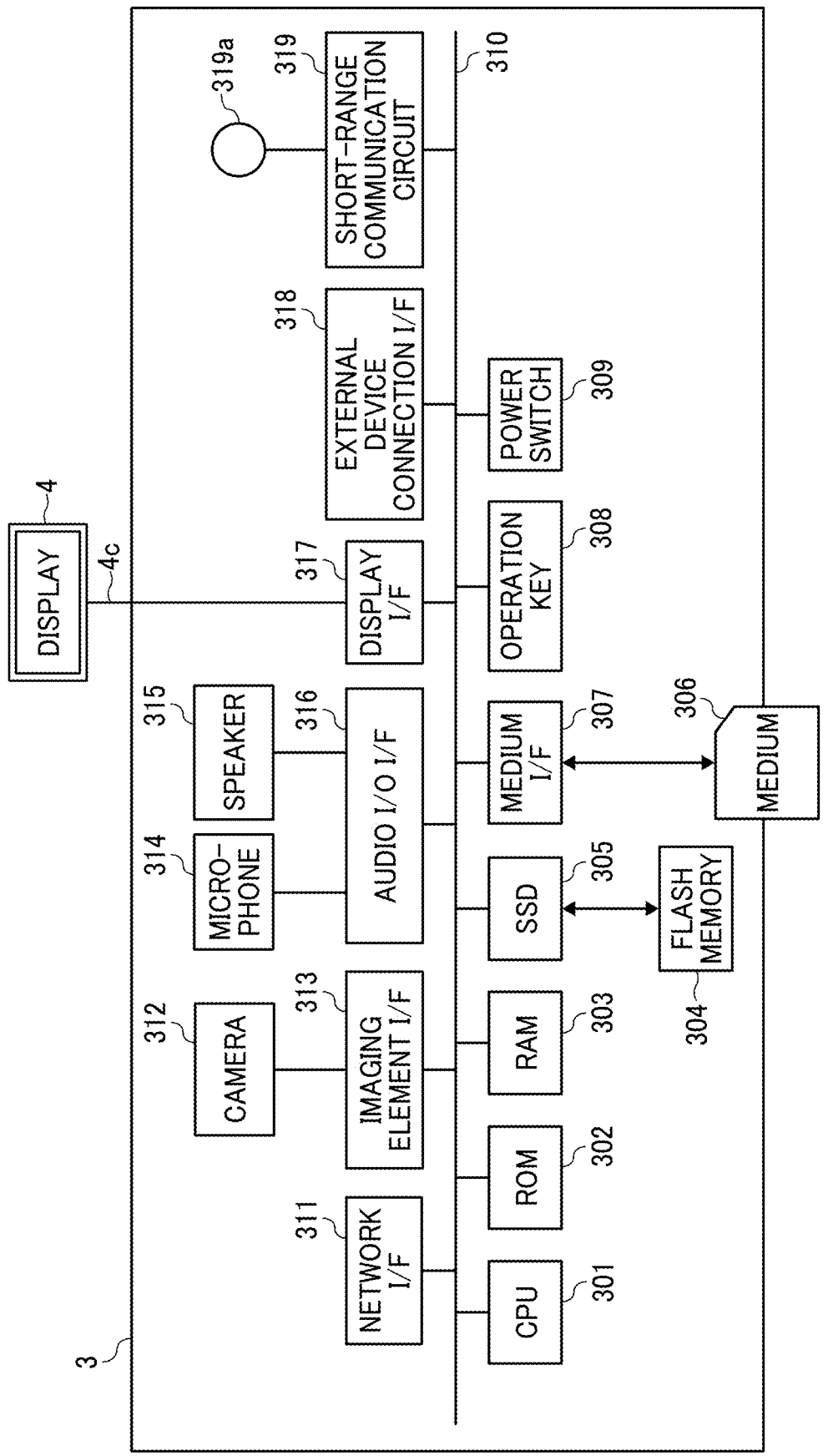
FIG. 11 is a block diagram illustrating a hardware configuration of a videoconference terminal according to an embodiment of the present disclosure.

Each of the videoconference terminal 3a and the videoconference terminal 3b is a terminal dedicated to videoconferencing. The videoconference terminal 3a and the videoconference terminal 3d display, on the display 4a and the display 4d, respectively, a video image obtained by performing a video communication (video call) via a wired cable such as a universal serial bus (USB) cable. The videoconference terminal 3a usually captures an image by a camera 312, as illustrated in FIG. 11, which is described later. However, when the videoconference terminal 3a is connected to a cradle 2a on which the image capturing device 1a is mounted, the image capturing device 1a is preferentially used. Accordingly, two hemispherical images are obtained, from which a spherical image is generated. In addition, the videoconference terminal 3a is connected to the PC 6 and obtains a screen of the PC 6. When a wired cable is used for connecting the videoconference terminal 3a and the cradle 2a, the cradle 2a supplies power to the image capturing device 1a and holds the image capturing device 1a in addition to establishing a communication between the image capturing device 1a and the videoconference terminal 3a. In the present embodiment, the image capturing device 1a, the cradle 2a, the videoconference terminal 3a, the display 4a, and the PC 6 are provided in the same site that is a site A. In addition, there are four users, a user A1, a user A2, a user A3 and a user A4, participating in the video communication in the site A. In addition, the videoconference terminal 3d and the display 4d are provided in the same site that is a site D. In the site D, there are three users, a user D1, a user D2, and a user D3, participating in the video communication.

The communication management system 5 manages and controls communication among the videoconference terminal 3a, the videoconference terminal 3d, the PC 7 and the smartphone 9. In addition, the communication management system 5 manages types of image data (a general image type and a special image type) to be transmitted or received in the communication among the videoconference terminal 3a, the videoconference terminal 3d, the PC 7 and the smartphone 9. In other words, the communication management system 5 is a communication control system. In the description of the present embodiment, a spherical image is used as a special image, and a planar image is used as a general image. The communication management system 5 is installed in, for example, an office of a service provider that provides a video communication service. The communication management system 5 may be configured as a single computer. Alternatively, the communication management system 5 may be configured as a plurality of computers, and one or more units (functions, means, or storages) are arbitrarily assigned to each of the plurality of computers. That is, the communication management system 5 may be implemented by a plurality of servers that operate in cooperation with one another.

The PC 6 generates material image data that is image data of a material image to be displayed in the videoconference. In this disclosure, the material image is any image to be presented for participants during the videoconference. Examples of the material image include an image displayed, created, or edited by a general-purpose application being executed on the PC 6, and an image, which is photographed by a general-purpose digital camera, reproduced on the PC 6. However, these are not intended to be limiting the embodiment.

The PC 7 can perform a video communication by connecting with the image capturing device 8. In the present embodiment, the PC 7 and the image capturing device 8 are provided in the same site that is a site C. There is one user, a user C, participating in the video communication in the site C.

The smartphone 9 includes a display 917, which is described later, and displays an image of the video communication on the display 917. The smartphone 9 includes a complementary metal oxide semiconductor (CMOS) sensor 905, and usually captures an image using the CMOS sensor 905. In addition, the smartphone 9 is capable of obtaining data of two hemispherical images, which are the original image data of a spherical image, captured by the image capturing device 1b using a wireless communication such as Wireless Fidelity (Wi-Fi) or Bluetooth (registered trademark). When such a wireless communication is used, a cradle 2b supplies power to the image capturing device 1b and holds the image capturing device 1b, but not establish a communication. In the present embodiment, the image capturing device 1b, the cradle 2b, and the smartphone 9 are provided in the same site that is a site B. In addition, two users, a user B1 and a user B2, are participating in the video communication in the site B.

Each of the videoconference terminal 3a, the videoconference terminal 3d, the PC 7 and the smartphone 9 is an example of a communication terminal. OpenGL ES is installed on each of the communication terminals to enable each of the communication terminals to generate predetermined area information that indicates a partial area of the spherical image, or to generate a predetermined area image from a spherical image that is transmitted from a different one of the communication terminals.

The arrangement of the terminals (i.e., the communication terminals, the displays, the image capturing devices), the apparatuses and the users illustrated in FIG. 9 is just an example, and any other suitable arrangement will suffice. For example, in the site C, an image capturing device that is capable of capturing a spherical image may be used in place of the image capturing device 8. In addition, examples of the communication terminal include a digital television, a smartwatch, and a car navigation device. In the following description, any arbitrary one of the image capturing device 1a and the image capturing device 1b is referred to as a "image capturing device 1". In addition, any arbitrary one of the videoconference terminal 3a and the videoconference terminal 3d is, hereinafter, referred to as a "videoconference terminal 3". In addition, any arbitrary one of the display 4a and the display 4d is, hereinafter, referred to as a "display 4".

Hardware Configuration

A description is now given of hardware configurations of the image capturing device 1, the videoconference terminal 3, the communication management system 5, the PC 6, the PC 7, and the smartphone 9 according to the present embodiment, with reference to FIG. 10 to FIG. 13. The image capturing device 8 is a general-purpose camera, and a detailed description of the image capturing device 8 is omitted here.

Hardware Configuration of Image Capturing Device

Figure 10:
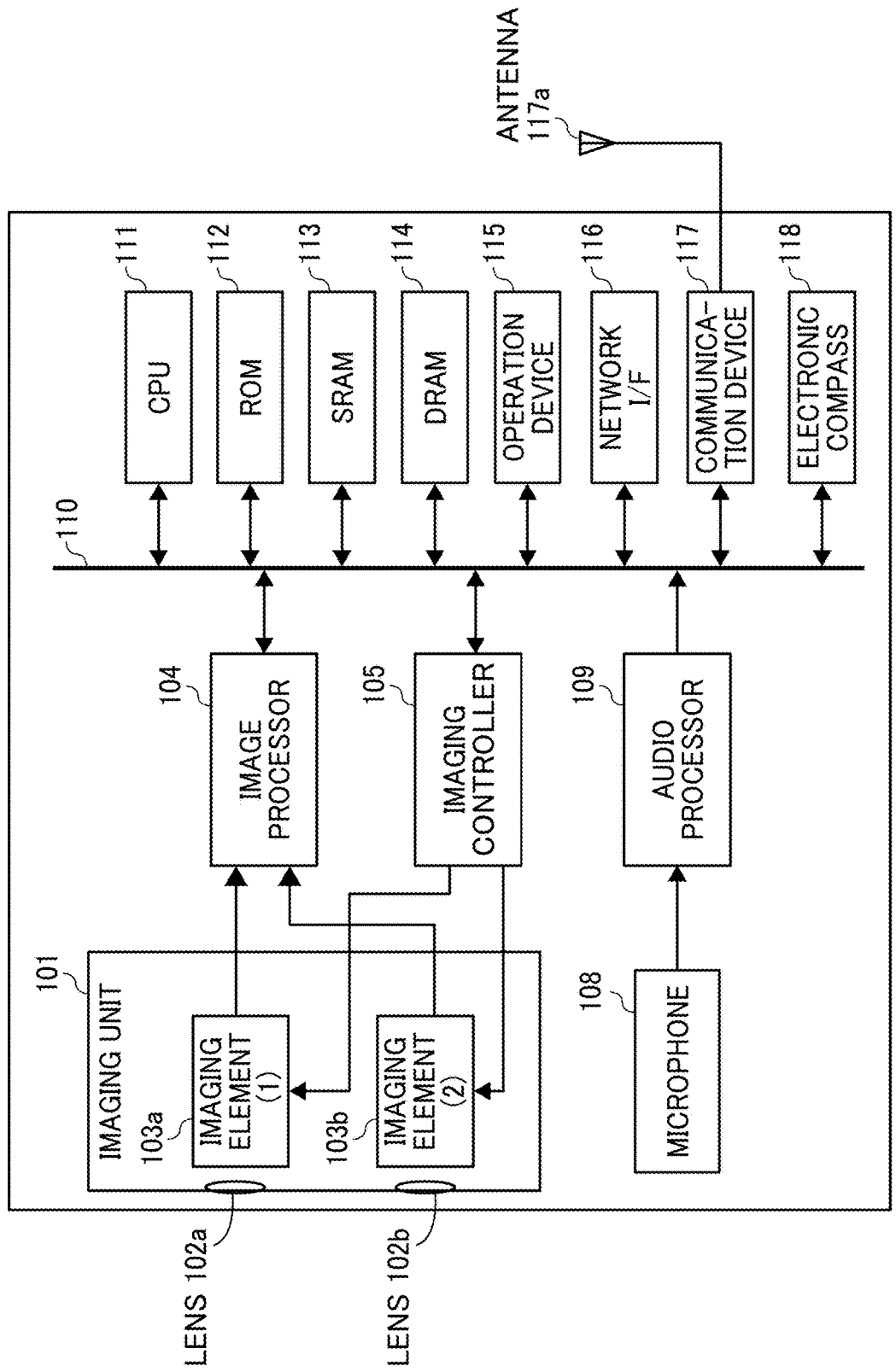
FIG. 10 is a block diagram illustrating a hardware configuration of an image capturing device according to an embodiment of the present disclosure.

A description is now given of a hardware configuration of the image capturing device 1 according to the present embodiment, with reference to FIG. 10. FIG. 10 is a block diagram illustrating a hardware configuration of the image capturing device 1 according to the present embodiment. In the following description of the embodiment, the image capturing device 1 that is a spherical (omnidirectional) image capturing device having two imaging elements is used. However, the image capturing device 1 may have more than two imaging elements. In addition, the image capturing device 1 is not necessarily an image capturing device dedicated to omnidirectional image capturing, but may be a general-purpose digital camera or a smartphone to which an external omnidirectional image capturing unit is attachable to implement substantially the same function as the image capturing device 1 in the description of the present embodiment (omnidirectional image capturing device).

As illustrated in FIG. 10, the image capturing device 1 includes an imaging unit 101, an image processor 104, an image controller 105, a microphone 108, an audio processor 109, a central processing unit (CPU) 111, a read only memory (ROM) 112, a static random access memory (SRAM) 113, a dynamic random access memory (DRAM) 114, an operation device 115, a network interface (I/F) 116, a communication device 117, and an antenna 117a.

The imaging unit 101 includes two wide-angle lenses (so-called fisheye lenses) 102a and 102b each of which has a field angle that is equal to or greater than 180 degrees to form a hemispherical image. The imaging unit 101 further includes the two imaging elements 103a and 103b corresponding to the wide-angle lenses 102a and 102b, respectively. Each of the imaging elements 103a and 103b includes an image sensor such as a CMOS sensor and a charge-coupled device (CCD) sensor, a timing generation circuit, and a group of registers. The image sensor converts an optical image formed by the fisheye lenses 102a and 102b into electric signals to output image data. The timing generation circuit generates horizontal or vertical synchronization signals, pixel clocks and the like for the image sensor. Various commands, parameters, and the like for operations of the imaging elements 103a and 103b are set in the group of registers.

Each of the imaging elements 103a and 103b of the imaging unit 101 is connected to the image processor 104 through a parallel I/F bus. In addition, each of the imaging elements 103a and 103b of the imaging unit 101 is connected to the image controller 105 through a serial I/F bus such as an inter-integrated circuit (I2C) bus. Each of the image processor 104 and the image controller 105 is connected to the CPU 111 through a bus 110. In addition, the ROM 112, the SRAM 113, the DRAM 114, the operation device 115, the network I/F 116, the communication device 117, and an electronic compass 118 are also connected to the bus 110.

The image processor 104 obtains image data from each of the imaging elements 103a and 103b through the parallel I/F bus and performs predetermined processing on the image data obtained from each of the imaging elements 103a and 103b separately and combines the processed image data to generate data representing a Mercator image as illustrated in FIG. 3C.

The image controller 105 usually functions as a master device while each of the imaging elements 103a and 103b usually functions as a slave device, and the image controller 105 sets commands in the group of registers of each of the imaging elements 103a and 103b through the I2C bus. The image controller 105 receives necessary commands from the CPU 111. In addition, the image controller 105 obtains status data of the group of registers of each of the imaging elements 103a and 103b through the I2C bus and transmits the status data to the CPU 111.

The image controller 105 instructs the imaging elements 103a and 103b to output the image data at a time when the shutter button of the operation device 115 is pressed. The image capturing device 1 can support a preview display function (e.g., displaying a preview on a display such as a display of the videoconference terminal 3a) or a movie display function. In case of displaying movie, the image data is continuously output from the imaging elements 103a and 103b at a predetermined frame rate (frames per minute).

Furthermore, the image controller 105 operates in conjunction with the CPU 111 to synchronize times when the imaging elements 103a and 103b output the image data. In the present embodiment, the image capturing device 1 does not include a display unit (display). However, in some embodiments, the image capturing device 1 may include a display.

The microphone 108 converts sound into audio data (signals). The audio processor 109 obtains the audio data from the microphone 108 through an I/F bus and performs predetermined processing on the audio data.

The CPU 111 controls the image capturing device 1 and performs necessary processing. The ROM 112 stores various programs to be executed by the CPU 111. Each of the SRAM 113 and the DRAM 114 operates as a work memory to store programs loaded from the ROM 112 to be executed by the CPU 111 or data being currently processed. More specifically, in one example, the DRAM 114 stores image data currently processed by the image processor 104 and data of the Mercator image on which processing has been performed.

The operation device 115 collectively refers to various operation keys, a power switch, a shutter button, and a touch panel having functions of both displaying information and receiving input from a user, which may be used in combination. The user operates the operation keys to input various image capturing modes or image capturing conditions.

The network I/F 116 collectively refers to an interface circuit such as a USB I/F that enables the image capturing device 1 to communicate with an external media such as a secure digital (SD) card or an external personal computer. The network I/F 116 supports at least one of a wired communication and a wireless communication. The data representing the Mercator image, which is stored in the DRAM 114, can be stored in the external media through the network I/F 116 or transmitted to the external device such as the videoconference terminal 3*a* via the network I/F 116, as needed.

The communication device 117 communicates with an external device such as the videoconference terminal 3*a* via the antenna 117*a* of the image capturing device 1 by a short range wireless communication such as Wi-Fi and Near Field Communication (NFC). The communication device 117 may transmit the data representing the Mercator image to a device external to the videoconference terminal 3*a*.

The electronic compass 118 computes an orientation and a tilt (roll angle) of the image capturing device 1 based on the Earth magnetism to output orientation and tilt information. The orientation and tilt information is an example of related information, which is metadata described in compliance with Exif. In addition, the orientation and tilt information is used for performing image processing, such as image correction, on captured image data. The related information also includes data indicating a time (date) when an image is captured by the image capturing device 1, and data indicating a size of image data (an amount of image data), for example.

Hardware Configuration of Videoconference Terminal

A description is now given of a hardware configuration of the videoconference terminal 3 according to the present embodiment of the disclosure, with reference to FIG. 11. FIG. 11 is a block diagram illustrating an example of the hardware configuration of the videoconference terminal 3 according to the present embodiment. As illustrated in FIG. 11, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output (I/O) interface 316, a display I/F 317, an external device connection I/F 318, a short-range communication circuit 319, and an antenna 319*a* for the short-range communication circuit 319.

The CPU 301 controls the entire operation of the videoconference terminal 3. The ROM 302 stores a control program such as an Initial Program Loader (IPL) used for operating the CPU 301. The RAM 303 is used as a work area for the CPU 301. The flash memory 304 stores various data such as a communication control program, image data, and audio data. The SSD 305 controls reading and/or writing of various data to and/or from the flash memory 304 under control of the CPU 301. In alternative to the SSD, a hard disk drive (HDD) may be used. The medium I/F 307 reads and/or writes (stores) data from and/or to a recording medium 306 such as a flash memory. The operation key 308 is operated according to a user input indicating an instruction in selecting a destination of a communication from the videoconference terminal 3, for example. The power switch 309 is a switch that turns on or off the power of the videoconference terminal 3.

The network I/F 311 enables the videoconference terminal 3 to establish a data communication with an external device via the communication network 100 such as the Internet. The camera 312 is an example of a built-in imaging device capable of capturing an object under control of the CPU 301 to obtain image data. The imaging element I/F 313 is a circuit that controls driving of the camera 312. The microphone 314 is an example of a built-in sound collecting device capable of inputting sounds. The audio input/output interface 316 is a circuit for controlling input and output of audio signals between the microphone 314 and the speaker 315 under control of the CPU 301. The display I/F 317 is a circuit for transmitting image data to an external display 4 under control of the CPU 301. The external device connection I/F 318 is an interface that connects the videoconference terminal 3 to various external devices. The short-range communication circuit 319 is a communication circuit such as NFC standard, Bluetooth (registered trademark) or the like.

The bus line 310, which includes an address bus and a data bus, electrically connects to various elements, including the CPU 301 illustrated in FIG. 11, one another.

The display 4 is an example of a display unit, such as a liquid crystal or organic electroluminescence (EL) display that displays an image of object, an operation icon, and the like. The display 4 is connected to the display I/F 317 by a cable 4*c*. The cable 4*c* may be an analog red green blue (RGB) (video graphic array (VGA)) signal cable, a component video cable, a high-definition multimedia interface (HDMI (registered trademark)) signal cable, or a digital video interactive (DVI) signal cable.

The camera 312 includes a lens and a solid-state imaging element that converts an image (video image) of object to electronic data by photoelectric conversion. Examples of the solid-state imaging element to be used include a CMOS sensor and a CCD sensor. The external device connection I/F 318 is capable of connecting the videoconference terminal 3 to an external device such as an external camera, an external microphone, or an external speaker through a USB cable, for example. When an external camera is connected, the external camera is driven in preference to the built-in camera 312 under control of the CPU 301. In a similar manner, when an external microphone is connected, or an external speaker is connected, the external microphone or the external speaker is driven in preference to the built-in microphone 314 or the built-in speaker 315 under control of the CPU 301.

The recording medium 306 is removable from the videoconference terminal 3. The flash memory 304 is replaceable with any suitable memory, such as an electrically erasable and programmable ROM (EEPROM), as long as the memory is a non-volatile memory that reads or writes data under control of CPU 301.

Hardware Configurations of Communication Management System and PC

Figure 12:
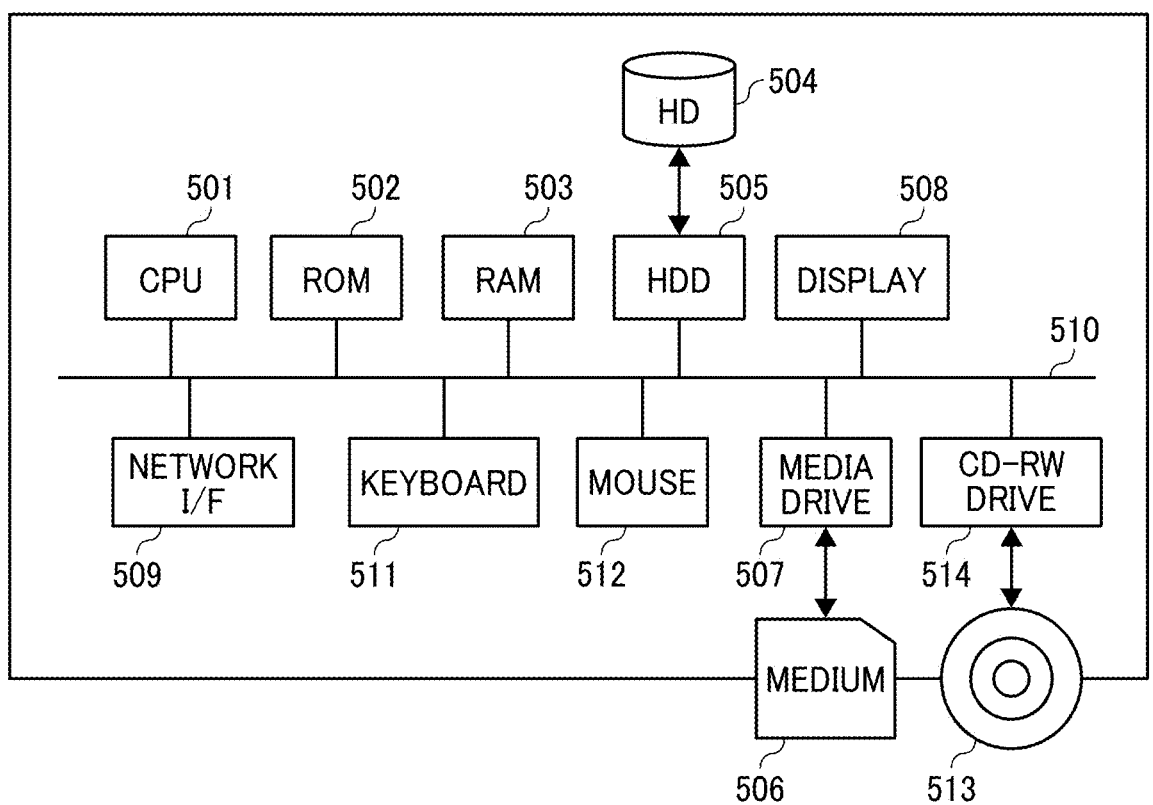
FIG. 12 is a block diagram illustrating a hardware configuration of any one of a communication management system and a personal computer (PC) according to an embodiment of the present disclosure.

A description is now given of a hardware configuration of each of the communication management system 5, PC 6, and the PC 7 according to the present embodiment, with reference to FIG. 12. FIG. 12 is a block diagram illustrating an example of the hardware configuration of any one of the communication management system 5, the PC 6, and the PC 7 according to the present embodiment. In the present embodiment, each of the communication management system 5, the PC 6, and the PC 7 is implemented by a computer having the same hardware configuration. In the following description, the communication management system 5 is used to describe the hardware configuration and the redundant description of the hardware configuration of each of the PC 6 and the PC 7 is omitted.

The communication management system 5 includes a CPU 501, a ROM 502, a RAM 503, a hard disk (HD) 504, a hard disc drive (HDD) 505, a media drive 507, a display 508, a network I/F 509, a keyboard 511, a mouse 512, a compact-disc rewritable (CD-RW) drive 514, and a bus line 510. The CPU 501 controls the entire operation of the communication management system 5. The ROM 502 stores programs such as an IPL to boot the CPU 501. The RAM 503 is used as a work area for the CPU 501. The HD 504 stores various data such as programs for the communication management system 5. The HDD 505 controls reading or writing of data from and to the HD 504 under control of the CPU 501. The media drive 507 controls reading or writing (storing) of data from or to a recording medium 506 such as a flash memory. The display 508 displays various information such as a cursor, menus, windows, characters, and images. The network I/F 509 enables the communication management system 5 to establish a communication with an external device via the communication network 100. The keyboard 511 includes a plurality of keys to allow a user to input characters, numbers, and various instructions. The mouse 512 allows a user to input an instruction for selecting and executing various functions, selecting an item to be processed, or moving the cursor. The CD-RW drive 514 controls reading of data from a CD-RW 513, which is an example of a removable recording medium. The bus line 510 electrically connects those parts or devices of the communication management system 5 to one other as illustrated in FIG. 12. Examples of the bus line 510 include an address bus and a data bus.

Hardware Configuration of Smartphone

Figure 13:
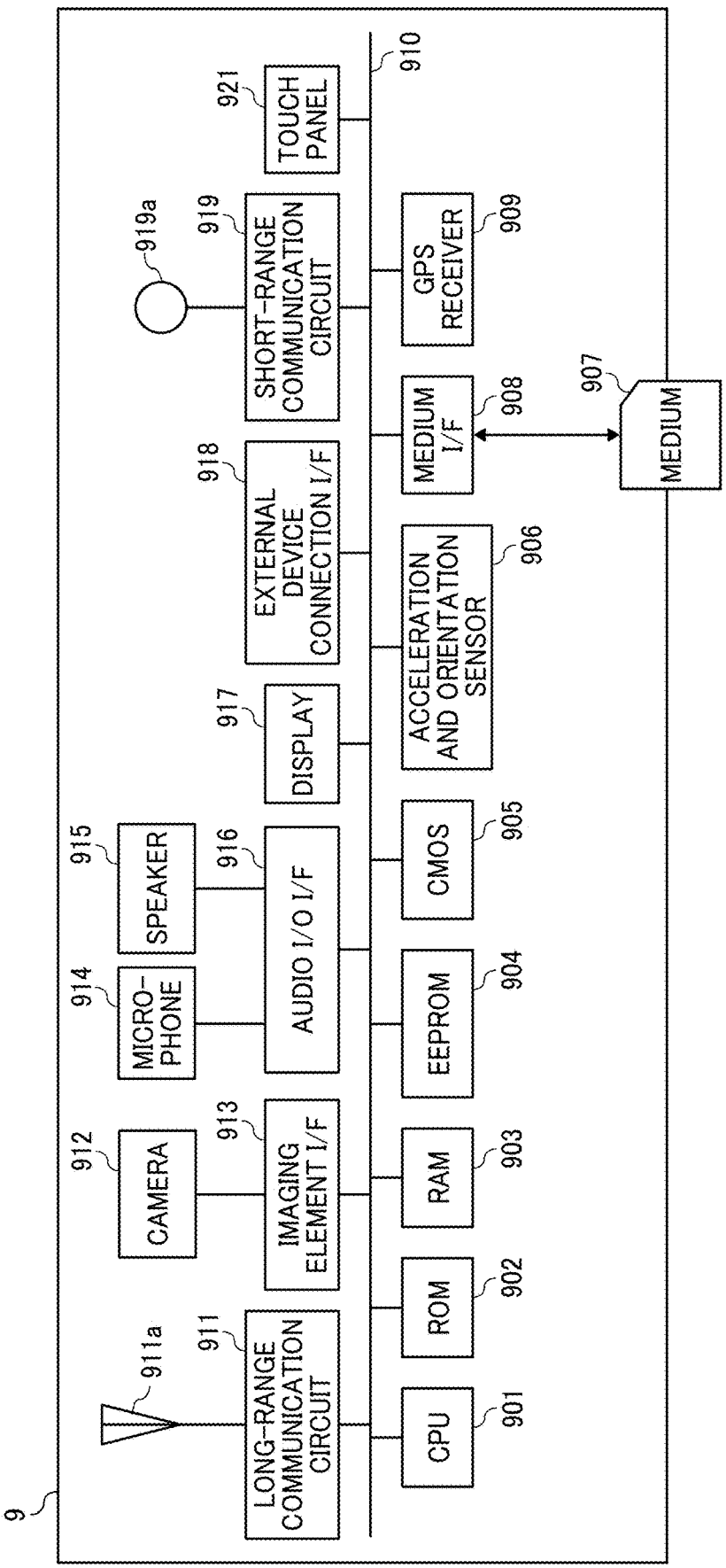
FIG. 13 is a block diagram illustrating a hardware configuration of a smartphone according to an embodiment of the present disclosure.

A description is now given of a hardware configuration of the smartphone 9 according to the present embodiment, with reference to FIG. 13. FIG. 13 is a block diagram illustrating an example of the hardware configuration of the smartphone 9 according to the present embodiment. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls the entire operation of the smartphone 9. The ROM 902 stores a program, such as an IPL, used for controlling the CPU 901. The RAM 903 is used as a work area for the CPU 901. The EEPROM 904 reads or writes various data such as a control program for the smartphone 9 under control of the CPU 901. The CMOS sensor 905 captures an object (mainly, a self-image of a user operating the smartphone 9) under control of the CPU 901 to obtain image data. The acceleration and orientation sensor 906 includes various sensors such as an electromagnetic compass for detecting geomagnetism, a gyrocompass, and an acceleration sensor. The medium I/F 908 controls reading and/or writing data from and/or to a recording medium 907, such as a flash memory. The GPS receiver 909 receives a GPS signal from a GPS satellite.

The smartphone 9 further includes a long-range communication circuit 911, a camera 912, an imaging element I/F 913, a microphone 914, a speaker 915, an audio input/output (I/O) I/F 916, a display 917, an external device connection I/F 918, a short-range communication circuit 919, an antenna 919a for the short-range communication circuit 919, and a touch panel 921.

The long-range communication circuit 911 is a circuit that enables the smartphone 9 to establish a communication with other device via the communication network 100. The camera 912 is an example of a built-in imaging device capable of capturing an object under control of the CPU 901 to obtain image data. The imaging element I/F 913 is a circuit that controls driving of the camera 912. The microphone 914 is an example of a built-in audio collecting device configured to input audio. The audio input/output interface 916 is a circuit for controlling input and output of audio signals between the microphone 914 and the speaker 915 under control of the CPU 901. The display 917 is an example of a display unit, such as a liquid crystal or organic electroluminescence (EL) display that displays an image of object, and/or an operation icon, for example. The external device connection I/F 918 is an interface that connects the smartphone 9 to various external devices. The short-range communication circuit 919 is a communication circuit such as a NFC standard, Bluetooth (registered trademark) or the like. The touch panel 921 is an example of an input device to operate the smartphone 9 according to a user operation of touching a surface of the display 917.

The smartphone 9 further includes a bus line 910. Examples of the bus line 910 include an address bus and a data bus. The bus line 910 electrically connects the elements including the CPU 901, one another.

In addition, a storage medium such as a compact-disc read only memory (CD-ROM) storing any of the above-described programs or an HD storing any of the above-described programs can be distributed domestically or overseas as a program product.

Functional Configuration

Figure 14:
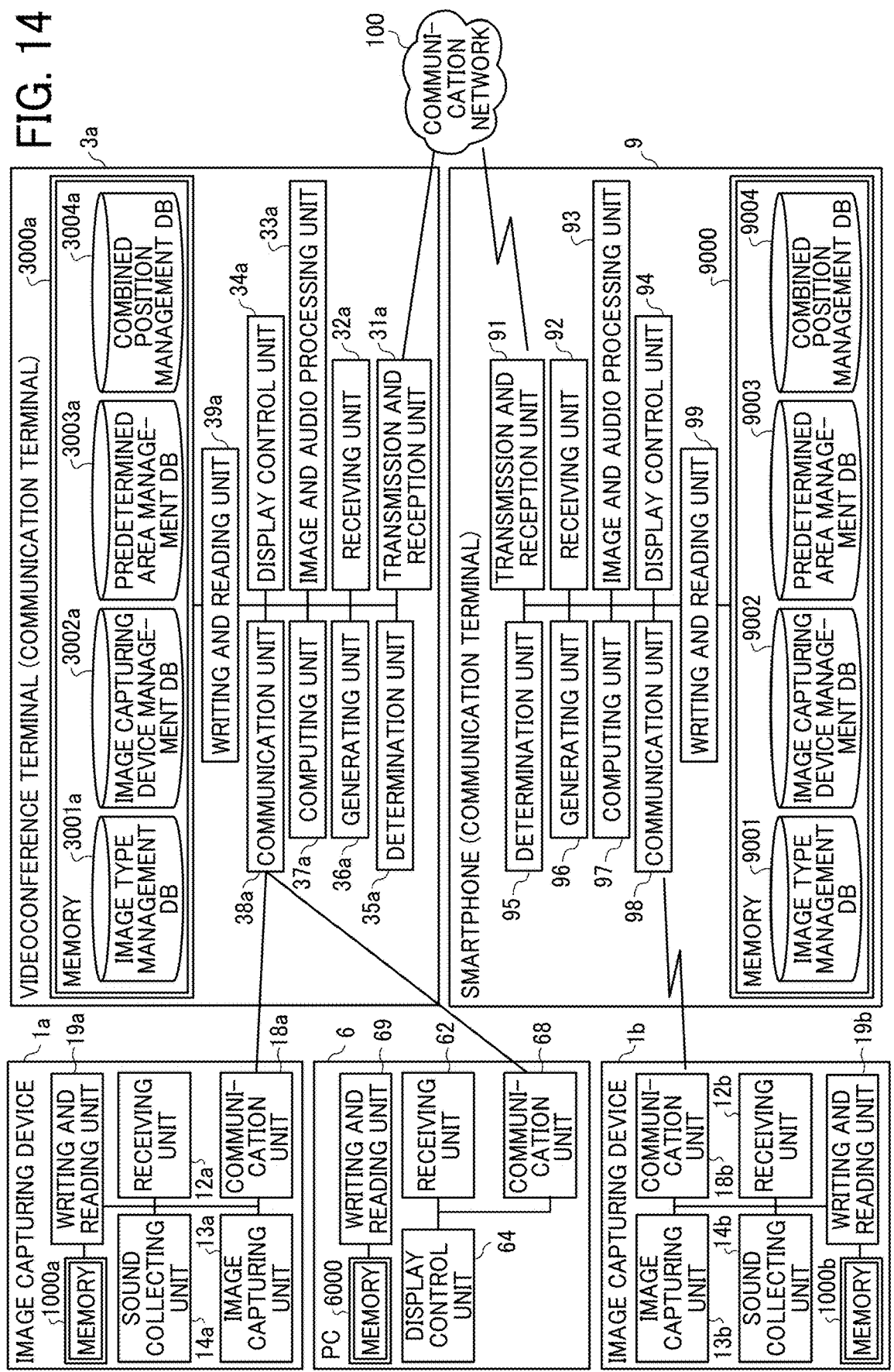
FIG. 14 is a schematic block diagram illustrating a part of a functional configuration of an image communication system according to an embodiment of the present disclosure.
Figure 15:
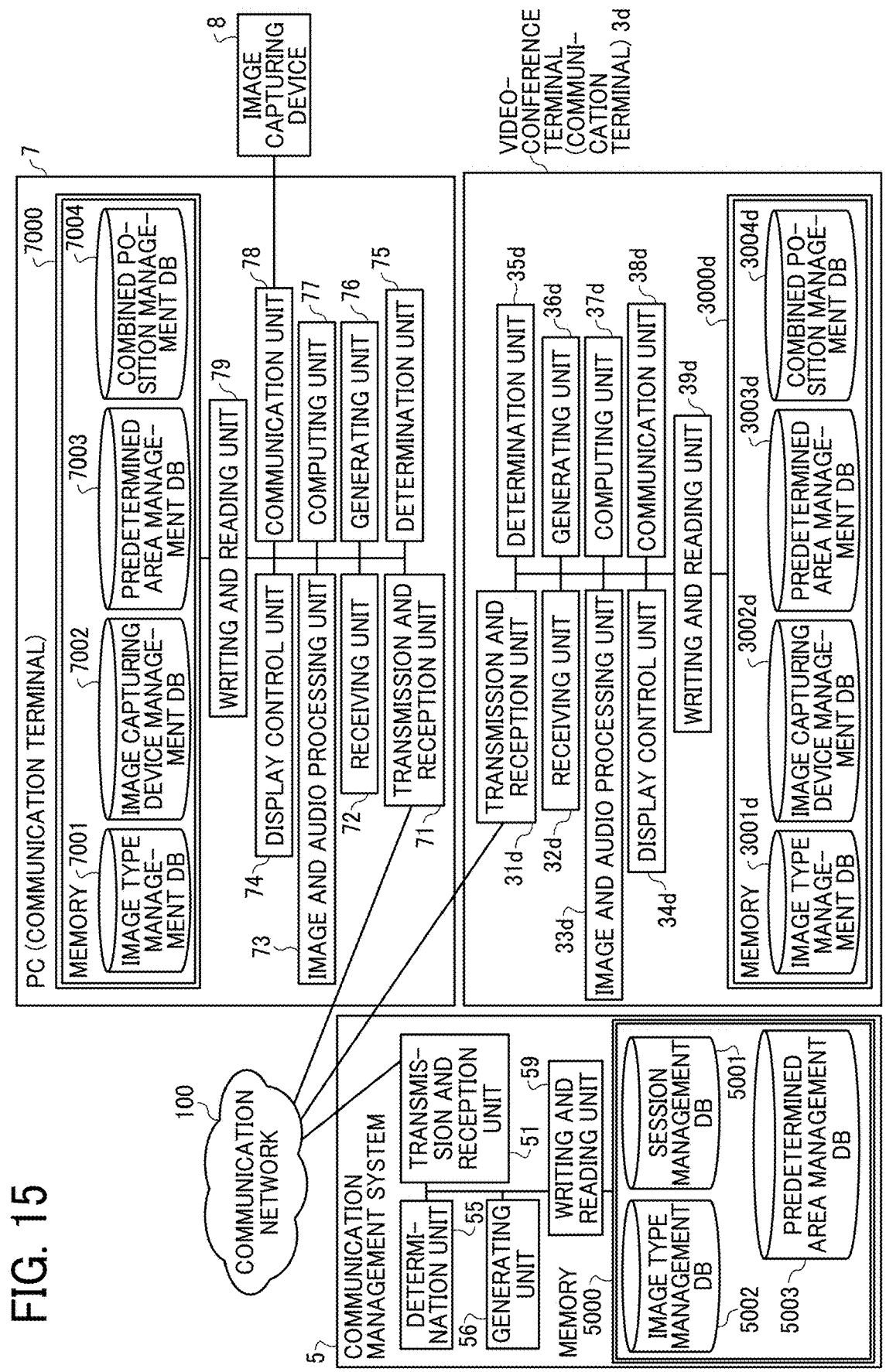
FIG. 15 is a schematic block diagram illustrating another part of a functional configuration of the image communication system according to an embodiment of the present disclosure.

A description is now given of a functional configuration of an image communication system according to the present embodiment, with reference to FIG. 14 to FIG. 21. FIG. 14 and FIG. 15 are block diagrams each of which illustrates a part of the functional configuration of the image communication system according to the present embodiment.

Functional Configuration of Image Capturing Device

As illustrated in FIG. 14, the image capturing device 1a includes a receiving unit 12a, an image capturing unit 13a, a sound collecting unit 14a, a communication unit 18a, and a writing and reading unit 19a. Each of the above-mentioned units is a function or a means that is implemented by operating any one or more of the elements illustrated in FIG. 10 according to instructions from the CPU 111 executing a control program for an image capturing device, which is expanded from the SRAM 113 to the DRAM 114.

The image capturing device 1a further includes a memory 1000a, which is implemented by the ROM 112, the SRAM 113, and the DRAM 114 illustrated in FIG. 10. The memory 1000a stores therein a globally unique identifier (GUID) identifying the own device (i.e., the image capturing device 1a).

The image capturing device 1b includes a receiving unit 12b, an image capturing unit 13b, a sound collecting unit 14b, a communication unit 18b, a writing and reading unit 19b, and a memory 1000b. Each of the above-mentioned functional units of the image capturing device 1b implements substantially the same function as corresponding one of the receiving unit 12a, the image capturing unit 13a, the sound collecting unit 14a, the communication unit 18a, the writing and reading unit 19a, and the memory 1000 of the image capturing device 1a, and the redundant description is omitted here.

Functional Units of Image Capturing Device

A detailed description is now given of each functional unit of the image capturing device 1a according to the present embodiment, with reference to FIG. 10 and FIG. 14.

The receiving unit 12a of the image capturing device 1a is mainly implemented by operation of the operation device 115 illustrated in FIG. 10 under control of the CPU 111 illustrated in FIG. 10. The receiving unit 12a receives an input according to a user operation.

The image capturing unit 13a is mainly implemented by operation of the imaging unit 101, the image processor 104, and the image controller 105 illustrated in FIG. 10 under control of the CPU 111 illustrated in FIG. 10. The image capturing unit 13a captures an image of object or surroundings to obtain captured image data.

The sound collecting unit 14a is implemented by operation of the microphone 108 and the audio processor 109 illustrated in FIG. 10 under control of the CPU 111 illustrated in FIG. 10. The sound collecting unit 14a collects sounds around the image capturing device 1a.

The communication unit 18a is mainly implemented by operation of the CPU 111 and communicates with a communication unit 38a of the videoconference terminal 3a using a short range wireless communication technology in compliance with such as NFC, Bluetooth (registered trademark), or Wi-Fi.

The writing and reading unit 19a is mainly implemented by operation of the CPU 111 illustrated in FIG. 10 and stores data or information in the memory 1000a or reads data or information from the memory 1000a.

Functional Configuration of Videoconference Terminal

As illustrated in FIG. 14, the videoconference terminal 3a includes a transmission and reception unit 31a, a receiving unit 32a, an image and audio processing unit 33a, a display control unit 34a, a determination unit 35a, a generating unit 36a, a computing unit 37a, a communication unit 38a, and a writing and reading unit 39a. Each of the above-mentioned units is a function or a means that is implemented by operating any one or more of the elements illustrated in FIG. 11 according to instructions from the CPU 301 executing a control program for the videoconference terminal 3a, which is expanded from the flash memory 304 to the RAM 303.

The videoconference terminal 3a further includes a memory 3000a that is implemented by the ROM 302, the RAM 303, and the flash memory 304 illustrated in FIG. 11. The memory 3000a includes an image type management database (DB) 3001a, an image capturing device management DB 3002a, a predetermined area management DB 3003a, and a combined position management DB 3004a. Among these DBs, the image type management DB 3001a is configured as an image type management table as illustrated in FIG. 16. The image capturing device management DB 3002a is configured as an image capturing device management table as illustrated in FIG. 17. The predetermined area management DB 3003a is configured as a predetermined area management table as illustrated in FIG. 18. The combined position management DB 3004a is configured as a combined position management table as illustrated in FIG. 19.

The videoconference terminal 3d includes a transmission and reception unit 31d, a receiving unit 32d, an image and audio processing unit 33d, a display control unit 34d, a determination unit 35d, a generating unit 36d, a computing unit 37d, communication unit 38d, a writing and reading unit 39d, and a memory 3000d. Each of the above-mentioned functional units of the videoconference terminal 3d implements substantially the same function as corresponding one of the transmission and reception unit 31a, the receiving unit 32a, the image and audio processing unit 33a, the display control unit 34a, the determination unit 35a, the generating unit 36a, the computing unit 37a, the communication unit 38a, the writing and reading unit 39a, and the memory 3000a of the videoconference terminal 3a, and the redundant description is omitted here. In addition, the memory 3000d of the videoconference terminal 3d includes an image type management DB 3001d, an image capturing device management DB 3002d, a predetermined area management DB 3003d, and a combined position management DB 3004d. These DBs 3001d, 3002d, 3003d and 3004d have substantially the same or similar data structure as or to the image type management DB 3001a, the image capturing device management DB 3002a, the predetermined area management DB 3003a, and the combined position management DB 3004a of the videoconference terminal 3a, respectively.

Image Type Management Table

FIG. 16 is a conceptual diagram illustrating the image type management table according to the present embodiment. The image type management table stores an image data identifier (ID), an internet protocol (IP) address, which is an example of an address of a transmission source terminal, and a source name, in association with one another. The image data ID is one example of image data identification information that identifies image data to be used in a video communication (video call). The same identical image data ID is assigned to image data transmitted from the same transmission source terminal. By the image data ID, a transmission destination terminal (namely, a communication terminal that receives the image data) identifies the transmission source terminal of the received image data. The IP address of the transmission source terminal is an IP address of a communication terminal that transmits image data identified by the corresponding image data ID, which is associated with the IP address. The source name, which is associated with the corresponding image data ID, is a name for identifying an image capturing device that outputs the image data identified by the corresponding image data ID, which is associated with the source name. The source name is one example of image type information. The source name is a name generated by a communication terminal such as the videoconference terminal 3a according to a predetermined naming rule.

The example of the image type management table illustrated in FIG. 16 indicates that four communication terminals, whose IP addresses are respectively "1.2.1.3", "1.2.2.3", "1.3.1.3", and "1.3.2.3" transmit image data identified by the image data ID "RS001", "RS002", "RS003", and "RS004", respectively. Further, according to the image type management table illustrated in FIG. 16, the image types represented by the source names of those four communication terminals are "Video_Theta", "Video_Theta", "Video", and "Video" that indicate the image types, which are "special image", "special image", "general image", and "general image", respectively. In the present embodiment, the "special image" is a spherical image.

In addition, data other than the image data may be stored in the image type management table in association with the image data ID. Examples of the data other than the image data include audio data.

Image Capturing Device Management Table

FIG. 17 is a conceptual diagram illustrating the image capturing device management table according to the present embodiment. The image capturing device management table stores a vendor ID and a product ID among the GUIDs of an image capturing device, which can obtain two hemispherical images, from which a spherical image is generated. As the GUID, a combination of a vendor ID (VID) and a product ID (PID) used in a USB device is used, for example. The vendor ID and the product ID are stored in a communication terminal such as a videoconference terminal before shipment. In another example, these IDs are added and stored in the videoconference terminal after shipment.

Predetermined Area Management Table

FIG. 18 is a conceptual diagram illustrating the predetermined area management table according to the present embodiment. The predetermined area management table stores an IP address of a transmission source terminal of captured image data representing a captured image, an IP address of a transmission destination terminal of the captured image data, and predetermined area information indicating a predetermined area image being displayed by the transmission destination terminal, in association with one another. The transmission destination terminal of the captured image data is identical to the transmission source terminal of the predetermined area information. The predetermined area information is a conversion parameter used to convert a captured image to an image of a predetermined area T of the captured image (predetermined area image), as illustrated in FIG. 6A, FIG. 6B, and FIG. 7. The IP address is used as one example of destination information. Other examples of the destination information include a media access control (MAC) address and a terminal ID, which identifies a corresponding communication terminal. In the description of the present embodiment, an IPv4 address is simplified to represent the IP address. The IP address may be IPv6.

In the example of FIG. 18, the predetermined area management table indicates, in the first line to the third line of the table, that the videoconference terminal 3a having an IP address of "1.2.1.3" transmits captured image data, via the communication management system 5, to the videoconference terminal 3d having an IP address of "1.2.2.3", the PC 7 having an IP address of "1.3.1.3", and the smartphone 9 having an IP address of "1.3.2.3". Further, the predetermined area management table illustrated in FIG. 18 indicates that the videoconference terminal 3d is a communication terminal that is also a transmission source of the predetermined area information (r=10, θ=20, φ=30). In substantially the same manner, the predetermined area management table indicates that the PC 7 is a transmission source terminal of the predetermined area information (r=20, θ=30, φ=40). Furthermore, the predetermined area management table indicates that the smartphone 9 is a transmission source terminal of the predetermined area information (r=30, θ=40, φ=50).

When the transmission and reception unit 31a newly receives predetermined area information including the same set of IP addresses of the communication terminal of transmission source and the communication terminal of transmission destination that is already managed in the table, the writing and reading unit 39a overwrites the currently managed predetermined area information with the newly received predetermined area information.

Combined Position Management Table

FIG. 19 is a conceptual diagram illustrating the combined position management table according to the present embodiment. The combined position management table manages an IP address of a transmission source terminal that transmits captured image data in association with combined position information indicating a predetermined position, which is also referred to as a combined position in the present embodiment, at which a spherical image and a material image are to be combined. The material image is a source image for combining. The spherical image is a destination image for combining. Namely, it can be said that a combined position is on the spherical image and the material image is combined with the spherical image at the combined position on the spherical image.

Figure 20:
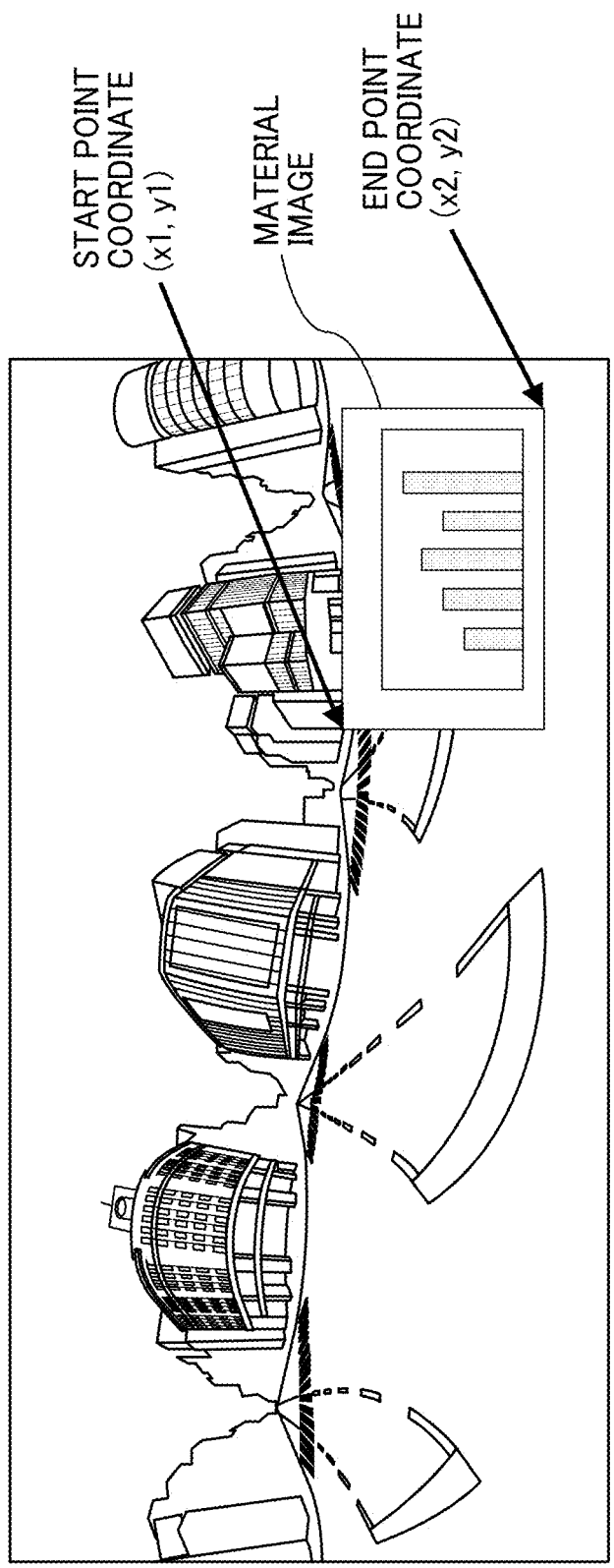
FIG. 20 is an illustration including a combined position according to an embodiment of the present disclosure.

A description is now given of coordinates for combining, which are examples of the combined position information, with reference to FIG. 20. FIG. 20 is an illustration of a Mercator image of a spherical image with which a material image is combined. The material image is a source image for combining. The coordinates for combining includes a start point coordinate and an end point coordinate. Assuming that the vertex position at the upper left corner of the material image, which is a source image for combining, is a start point, the start point coordinate is (0, 0) and the end point coordinate is (xn, yn). In this case, when the material image is to combined with the Mercator image in manner that the start point coordinate (0, 0) and the end point coordinate (xn, yn) of the material image corresponds to a coordinate (x1, y1) and a coordinate (x2, y2) on the Mercator image, (x1, x2) is stored as a start point coordinate for combining and (x2, y2) is stored as an end point coordinate for combining in the combined position management table in association with the IP address. The IP address is used as one example of destination information. Other examples of the address information include a MAC address and a terminal ID, which identifies a corresponding communication terminal. In the description of the present embodiment, an IPv4 address is simplified to represent the IP address. The IP address may be IPv6.

Functional Units of Videoconference Terminal

A detailed description is now given of each functional unit of the videoconference terminal 3a according to the present embodiment, with reference to FIG. 11 and FIG. 14.

The transmission and reception unit 31a of the videoconference terminal 3a is implemented by the network I/F 311 illustrated in FIG. 11, when operating under control of the CPU 301. The transmission and reception unit 31a transmits or receives data or information to or from the communication management system 5 via the communication network 100.

The receiving unit 32a is implemented by the operation key 308, when operating under control of the CPU 301. The receiving unit 32a receives selections or inputs from a user. In another example, an input device such as a touch panel is used in addition to or in place of the operation key 308.

The image and audio processing unit 33a is implemented by instructions from the CPU 301 illustrated in FIG. 11, and processes image data obtained by capturing an object by the camera 312. After voice sounds generated by a user is converted into audio signals by the microphone 314, the image and audio processing unit 33a performs processing on audio data associated with the audio signals.

Further, the image and audio processing unit 33a processes image data received from another communication terminal based on the image type information, such as a source name, to enable the display control unit 34a to cause the display 4 to display an image based on the processed image data. More specifically, when the image type information indicates "special image", the image and audio processing unit 33a converts the image data such as hemispherical image data as illustrated in FIG. 3A and FIG. 3B into spherical image data to generate a spherical image as illustrated in FIG. 4B. Furthermore, when there is a material image to be combined with the spherical image, the image and audio processing unit 33a generates a combined image, which is an image generated by combining the material image with the spherical image, based on the material image data and the combined position information. Note that examples of combining a first image, which is the spherical image, with a second image, which is a material image, are, for example, superimposing the second image on a part of the first image, and overlapping the second image on a part of the first image. In addition, the material image may be embedded in place of a part of the spherical image. Further, the image and audio processing unit 33a generates a predetermined area image as illustrated in FIG. 6B. Furthermore, the image and audio processing unit 33a outputs, to the speaker 315, audio signals associated with audio data received from another communication terminal via the communication management system 5 to cause the speaker 315 to output the voice sounds based on the audio signal.

The display control unit 34a is implemented by the display I/F 317, when operating under control of the CPU 301. The display control unit 34a causes the display 4 to display images or characters.

The determination unit 35a, which is mainly implemented by instructions of the CPU 301, determines an image type corresponding to image data received from, for example, the image capturing device 1a. This determination is just one example performed by the determination unit 35a, and the determination unit 35a performs other various determinations regarding image data.

The generating unit 36a is implemented by instructions of the CPU 301. The generating unit 36a generates a source name, which is one example of the image type information, according to the above-described naming rule, based on a determination result generated by the determination unit 35a indicating a general image or a special image (that is, a spherical image in the present embodiment). For example, when the determination unit 35a determines that an image type is "general image", the generating unit 36a generates a source name of "Video" that indicates a "general image" type. On the other hand, when the determination unit 35a determines that an image type is "special image", the generating unit 36a generates a source name of "Video_Theta" that indicates a "special image" type.

The computing unit 37a, which is mainly implemented by instructions of the CPU 301, calculates the combined position information.

The communication unit 38a is mainly implemented by the short-range communication circuit 319 and the antenna 319a, each of which operates under control of the CPU 301. The communication unit 38a communicates with the communication unit 18a of the image capturing device 1a using a short range wireless communication network in compliance with an NFC standard, Bluetooth (registered trademark), or Wi-Fi, for example. In the above description, the communication unit 38a and the transmission and reception unit 31a individually have a communication unit. In another example, the communication unit 38a and the transmission and reception unit 31a share a single communication unit.

The writing and reading unit 39a is mainly implemented by instructions from the CPU 301 illustrated in FIG. 11 and stores data or information in the memory 3000 or reads data or information from the memory 3000.

Functional Configuration of Communication Management System

A detailed description is now given of each functional unit of the communication management system 5 according to the present embodiment, with reference to FIG. 12 and FIG. 15. The communication management system 5 includes a transmission and reception unit 51, a determination unit 55, a generating unit 56, and a writing and reading unit 59. Each of the above-mentioned units is a function or a means that is implemented by operating any one or more of the elements illustrated in FIG. 12 according to instructions from the CPU 501 executing a control program for the communication management system 5, which is expanded from the HD 504 to the RAM 503.

The communication management system 5 further includes a memory 5000 that is implemented by the RAM 503 and the HD 504 illustrated in FIG. 12. The memory 5000 includes a session management DB 5001, an image type management DB 5002, and a predetermined area management DB 5003. The session management DB 5001 is implemented by a session management table illustrated in FIG. 21. The image type management DB 5002 is implemented by an image type management table illustrated in FIG. 22. The predetermined area management DB 5003 is implemented by a predetermined area management table illustrated in FIG. 23.

Session Management Table

FIG. 21 is a conceptual diagram illustrating the session management table according to the present embodiment. The session management table stores a session ID and an IP address of a participant communication terminal, in association with one another. The session ID is one example of session identification information (identifier) that identifies a session implementing a video communication. Each session ID is generated for a corresponding virtual conference room. One or more session IDs are also stored and managed in each communication terminal, such as the videoconference terminal 3a, to be used by each communication terminal to select a communication session. The IP address of the participant communication terminal indicates an IP address of a communication terminal that participates in a virtual conference room identified by an associated session ID.

Image Type Management Table

FIG. 22 is a conceptual diagram illustrating the image type management table according to the present embodiment. The image type management table illustrated in FIG. 22 stores, in addition to the information items stored in the image type management table illustrated in FIG. 16, the same session IDs as those stored in the session management table. The items stored in a record of the image type management table are associated with one another. The example of the image type management table illustrated in FIG. 20 indicates that three communication terminals whose IP addresses are "1.2.1.3", "1.2.2.3", and "1.3.1.3" are participating in a virtual conference room identified by the session ID "se101". The communication management system 5 stores the same image data ID, IP address of the transmission source terminal, and image type information as those stored in a communication terminal, such as the videoconference terminal 3a. This enables the communication management system 5 to transmit the image type information, etc., to a communication terminal that is currently participating in the video communication and another communication terminal that newly participates in the video communication by entering a virtual conference room of the video communication. Accordingly, the communication terminal that is already in the video communication and the communication terminal that is newly participates in the video communication do not have to exchange such information including the image type information.

Predetermined Area Management Table

FIG. 23 is a conceptual diagram illustrating the predetermined area management table according to the present embodiment. The predetermined area management illustrated in FIG. 23 has substantially the same data structure as the predetermined area management table illustrated in FIG. 18. As described later, the transmission and reception unit 51 transmits, to each communication terminal, the latest predetermined area information at preset intervals such as every thirty seconds. Accordingly, all the predetermined area information received by the transmission and reception unit 51 during a period from when the predetermined area information is transmitted the last time to when the latest predetermined area information is transmitted, is saved without being deleted. In the example of FIG. 23, the newer the predetermined area information is, the upper a record is in the predetermined area management table.

Functional Units of Communication Management System

A detailed description is now given of each functional unit of the communication management system 5 according to the present embodiment, with reference to FIG. 12 and FIG. 15.

The transmission and reception unit 51 of the communication management system 5 is implemented by the network I/F 509 illustrated in FIG. 12, when operating under control of the CPU 501. The transmission and reception unit 51 transmits or receives data or information to or from the videoconference terminal 3a, the videoconference terminal 3d, or the PC 7 via the communication network 100.

The determination unit 55, which is mainly implemented by operation of the CPU 501 and performs various determinations.

The generating unit 56 is mainly implemented by operation of the CPU 501 and generates an image data ID.

The writing and reading unit 59 is implemented by the HDD 505 illustrated in FIG. 12, when operating under control of the CPU 501. The writing and reading unit 59 stores data or information in the memory 5000 or reads out data or information from the memory 5000.

Functional Configuration of PC

A detailed description is now given of a functional configuration of the PC 6 according to the present embodiment, with reference to FIG. 12 and FIG. 14.

As illustrated in FIG. 14, the PC 6 includes a receiving unit 62, a display control unit 64, a communication unit 68, and a writing and reading unit 69. Each of the above-mentioned units is a function or a means that is implemented by or that is caused to function by operating any one or more of the hardware elements illustrated in FIG. 12 in cooperation with instructions from the CPU 501 according to a control program for the PC 6, expanded from the HD 504 to the RAM 503.

The PC 6 further includes a memory 6000, which is implemented by the ROM 502, the RAM 503, and the HD 504 illustrated in FIG. 12.

Functional Units of PC

The receiving unit 62 of the PC 6 is mainly implemented by operation of the keyboard 511 or the mouse 512 under control of the CPU 501 and implements substantially the same function as the receiving unit 32a. The display control unit 64 is implemented by the CPU 501, when executing according to the program, to control the display 508 to display images or characters. The communication unit 68 is mainly implemented by operation of the CPU 501 and communicates with a communication unit 38a of the videoconference terminal 3a using a short range wireless communication network in compliance with such as NFC, Bluetooth (registered trademark), or Wi-Fi. The writing and reading unit 69, which is mainly implemented by instructions of the CPU 501, stores various data or information in the memory 6000 or reads out various data or information from the memory 6000.

Functional Configuration of PC as Communication Terminal

A detailed description is now given of a functional configuration of the PC 7 according to the present embodiment, with reference to FIG. 12 and FIG. 15. The PC 7 has substantially the same functions as those of the videoconference terminal 3a. Namely, as illustrated in FIG. 14, the PC 7 includes a transmission and reception unit 71, a receiving unit 72, an image and audio processing unit 73, a display control unit 74, a determination unit 75, a generating unit 76, a computing unit 77, a communication unit 78, and a writing and reading unit 79. Each of the above-mentioned units is a function or a means that is implemented by operating any one or more of the elements illustrated in FIG. 12 according to instructions from the CPU 501 executing a control program for the PC 7, which is expanded from the HD 504 to the RAM 503.

The PC 7 further includes a memory 7000, which is implemented by the ROM 502, the RAM 503 and the HD 504 illustrated in FIG. 12. The memory 7000 includes an image type management DB 7001, an image capturing device management DB 7002, a predetermined area management DB 7003, and a combined position management DB 7004. The image type management DB 7001, the image capturing device management DB 7002, the predetermined area management DB 7003, and the combined position management DB 7004 have substantially the same data structure as the image type management DB 3001*a*, the image capturing device management DB 3002*a*, the predetermined area management DB 3003*a*, and the combined position management DB 3004*a*, respectively, and redundant descriptions thereof are omitted here.

Each Functional Unit of PC as Communication Terminal

The transmission and reception unit 71 of the PC 7 is mainly implemented by operation of the network I/F 509 illustrated in FIG. 12 under control of the CPU 501 illustrated in FIG. 12 and implements substantially the same function as the transmission and reception unit 31*a*. The receiving unit 72 is mainly implemented by operation of the keyboard 511 or the mouse 512 under control of the CPU 501 and implements substantially the same function as the receiving unit 32*a*. The image and audio processing unit 73 is mainly implemented by instructions from the CPU 501 and implements substantially the same function as the image and audio processing unit 33*a*. The display control unit 74 is mainly implemented by operation of the CPU 501 and implements substantially the same function as the display control unit 34*a*. The determination unit 75 is mainly implemented by operation of the CPU 501 and implements substantially the same function as the determination unit 35*a*. The generating unit 76 is mainly implemented by operation of the CPU 501 and implements substantially the same function as the generating unit 36*a*. The computing unit 77 is mainly implemented by operation of the CPU 501 and implements substantially the same function as the computing unit 37*a*. The communication unit 78 is mainly implemented by operation of the CPU 501 and implements substantially the same function as the communication unit 38*a*. The writing and reading unit 79 is implemented by operation of the CPU 501 and stores data or information in the memory 7000 or reads data or information from the memory 7000.

Functional Configuration of Smartphone

A detailed description is now given of a functional configuration of the smartphone 9 according to the present embodiment, with reference to FIG. 13 and FIG. 14. The smartphone 9 has substantially the same functions as the videoconference terminal 3*a*. That is, as illustrated in FIG. 14, the smartphone 9 includes a transmission and reception unit 91, a receiving unit 92, an image and audio processing unit 93, a display control unit 94, a determination unit 95, a generating unit 96, a computing unit 97, a communication unit 98, and a writing and reading unit 99. Each of the above-mentioned units is a function or a means that is implemented by operating any one or more of the elements illustrated in FIG. 13 according to instructions from the CPU 901 executing a control program for the smartphone 9, which is expanded from the EEPROM 904 to the RAM 903.

The smartphone 9 further includes a memory 9000, which is implemented by the ROM 902, the RAM 903, and the EEPROM 904 illustrated in FIG. 13. The memory 9000 includes an image type management DB 9001, an image capturing device management DB 9002, a predetermined area management DB 9003, and a combined position management DB 9004. The image type management DB 9001, the image capturing device management DB 9002, the predetermined area management DB 9003, and the combined position management DB 9004 have substantially the same data structure as the image type management DB 3001*a*, the image capturing device management DB 3002*a*, the predetermined area management DB 3003*a*, and the combined position management DB 3004*a*, respectively, and redundant descriptions thereof are omitted here.

Functional Units of Smartphone

The transmission and reception unit 91 of the smartphone 9 is mainly implemented by operation of the long-range communication circuit 911 illustrated in FIG. 13 under control of the CPU 901 illustrated in the FIG. 13 and implements substantially the same function as the transmission and reception unit 31*a*.

The receiving unit 92 is mainly implemented by the touch panel 921 under control of the CPU 901 and implements substantially the same function as the receiving unit 32*a*.

The image and audio processing unit 93 is mainly implemented by instructions from the CPU 901 and implements substantially the same function as the image and audio processing unit 33*a*. The display control unit 94, which is mainly implemented by operation of the CPU 901 and implements substantially the same function as the display control unit 34*a*. The determination unit 95 is mainly implemented by operation of the CPU 901 and implements substantially the same function as the determination unit 35*a*. The generating unit 96 is mainly implemented by operation of the CPU 901 and implements substantially the same function as the generating unit 36*a*. The computing unit 97 is mainly implemented by operation of the CPU 901 and implements substantially the same function as the computing unit 37*a*. The communication unit 98 is mainly implemented by operation of the CPU 901 and implements substantially the same function as the communication unit 38*a*. The writing and reading unit 99 is implemented by operation of the CPU 901 and stores data or information in the memory 9000 or reads data or information from the memory 9000.

Operation or Process

Referring now to FIG. 24 to FIG. 35, a description is given of an operation or processes according to the present embodiment.

Participation Process

Figure 24:
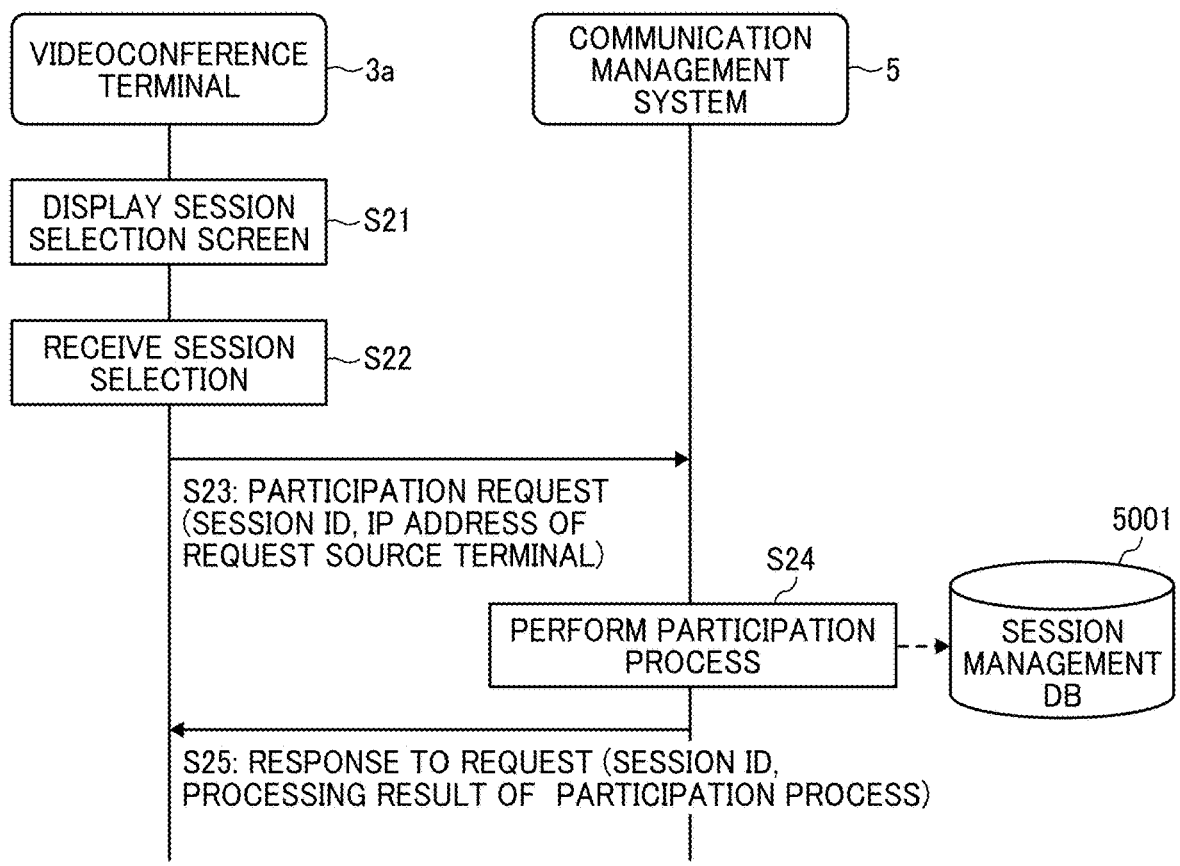
FIG. 24 is a sequence diagram illustrating a process of participating in a specific communication session, according to an embodiment of the present disclosure.
Figure 25:
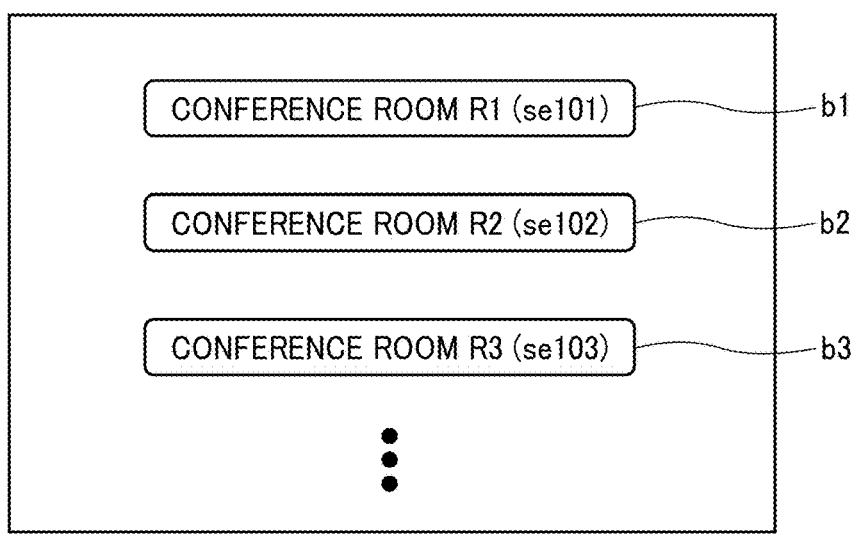
FIG. 25 is an illustration of a session selection screen for selecting a communication session (virtual conference room), according to an embodiment of the present disclosure.

Referring now to FIG. 24 and FIG. 25, an operation of participating in a specific communication session is described below, according to the embodiment. FIG. 24 is a sequence diagram illustrating a process of participating in a specific communication session, according to the embodiment. FIG. 25 is an illustration of a session selection screen for selecting a communication session (virtual conference room), according to the embodiment.

When a user in the site A (e.g., user A1) operates the videoconference terminal 3*a* to display the session selection screen for selecting a communication session (virtual conference room), the receiving unit 32*a* receives the operation to display the session selection screen, and the display control unit 34*a* causes the display 4*a* to display the session selection screen as illustrated in FIG. 25 (step S21). In the session selection screen, selection buttons b1, b2, and b3 are displayed. The selection buttons b1, b2, and b3 respectively indicates virtual conference rooms R1, R2, R3, each of which is a selection target. Each of the selection buttons b1, b2, and b3 is associated with a corresponding session ID.

When the user A1 selects a desired selection button (in this example, the selection button b1) on the session selection screen, the receiving unit 32a receives selection of a corresponding communication session (step S22). Then, the transmission and reception unit 31a transmits, to the communication management system 5, a request to participate in the communication session, namely to enter the corresponding virtual conference room (step S23). Hereinafter, the request is also referred to as a participation request. The participation request includes a session ID identifying the communication session, which is selected and received at step S22, and the IP address of the videoconference terminal 3a, which is a request transmission source terminal. The transmission and reception unit 51 of the communication management system 5 receives the participation request.

Subsequently, the writing and reading unit 59 performs a process for causing the videoconference terminal 3a to participate in the communication session (step S24). More specifically, the writing and reading unit 59 adds, in the session management DB 5001 (see FIG. 21), the IP address received at step S23 to a field of the participant terminal IP address in a record of the session ID that is the same as the session ID received at step S23. The transmission and reception unit 51 transmits a response to the participation request to the videoconference terminal 3a (step S25). The response to the participation request includes the session ID that is received at step S23, and a result of the participation process. The transmission and reception unit 31a of the videoconference terminal 3a receives the response to the participation request. The following describes a case where the process for causing the videoconference terminal 3a to participate in the communication session, namely participation process, is successfully completed.

Process of Managing Image Type Information

Figure 26:
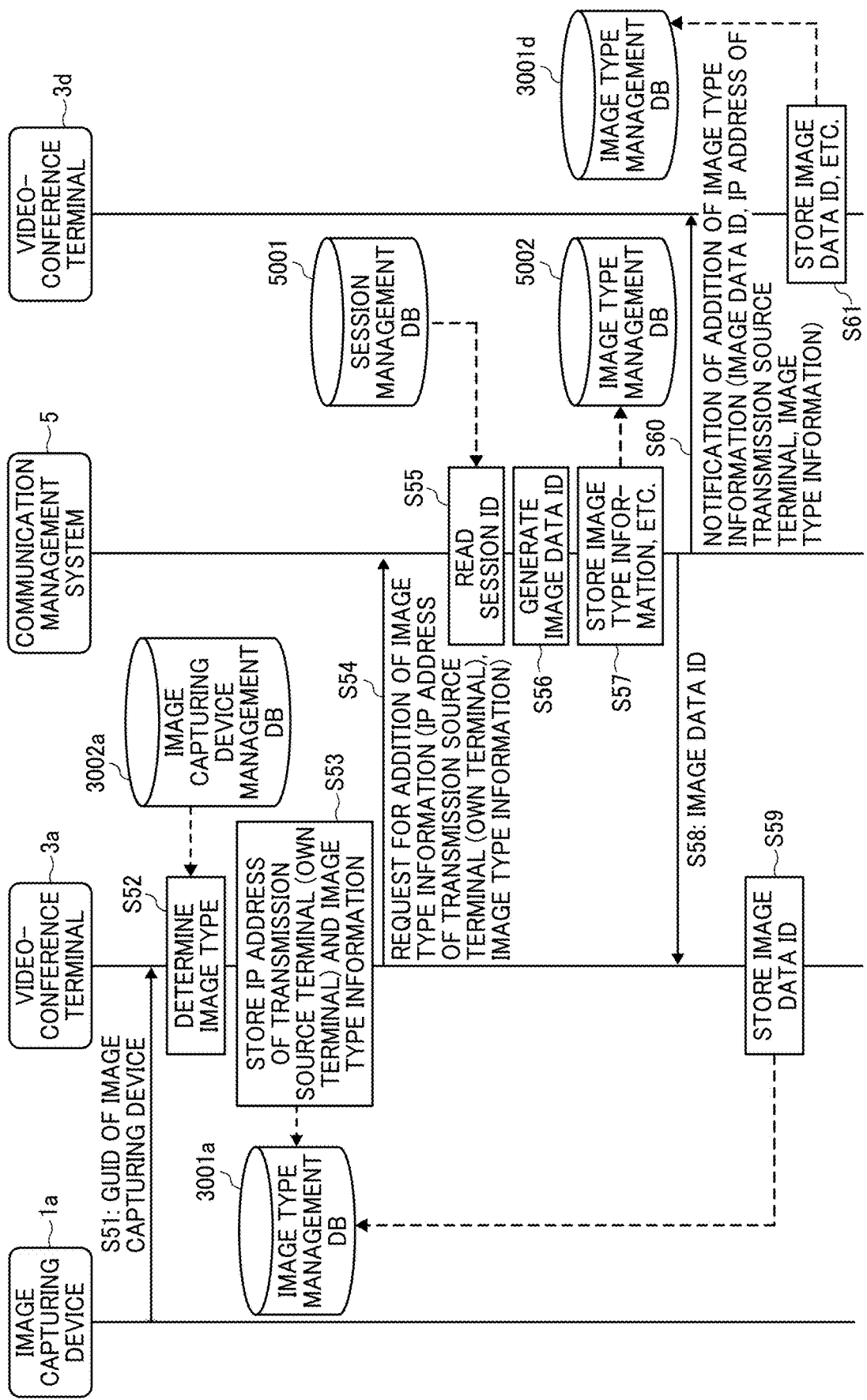
FIG. 26 is a sequence diagram illustrating a process of managing image type information, according to an embodiment of the present disclosure.

A description is now given of a process of managing the image type information according to the present embodiment with reference to FIG. 26. FIG. 26 is a sequence diagram illustrating the process of managing the image type information according to the present embodiment.

When a user in the site A (e.g., the user A1) connects the cradle 2a, on which the image capturing device 1a is mounted, to the videoconference terminal 3a, using a wired cable such as a USB cable, the writing and reading unit 19a of the image capturing device 1a reads the GUID of the own device (e.g., the image capturing device 1a) from the memory 1000a. Then, the communication unit 18a transmits the own device's GUID to the communication unit 38a of the videoconference terminal 3 (step S51). The communication unit 38a of the videoconference terminal 3a receives the GUID of the image capturing device 1a.

Subsequently, the determination unit 35a of the videoconference terminal 3a determines whether a vendor ID and a product ID that are same as those in the GUID received at step S51 are stored in the image capturing device management DB 3002a (see FIG. 17) to determine the image type (step S52). More specifically, the determination unit 35a determines that the image capturing device 1a is an image capturing device that captures a special image (a spherical image in the present embodiment), when the same vender ID and product ID are stored in the image capturing device management DB 3002a. On the other hand, the determination unit 35a determines that the image capturing device 1a is an image capturing device that captures a general image, when the same vender ID and product ID are not stored in the image capturing device management DB 3002a.

Subsequently, the writing and reading unit 39a stores, in the image type management DB 3001a (see FIG. 16), the IP address of the own terminal (i.e., the videoconference terminal 3a) that is a transmission source terminal, in association with the image type information that is a determination result determined at step S52 (step S53). In this state, any image data ID is not yet associated. Examples of the image type information include a source name, which is determined according to a predetermined naming rule, and an image type ("general image" or "special image").

Then, the transmission and reception unit 31a transmits a request for addition of the image type information to the communication management system 5 (step S54). The request for addition of the image type information includes the IP address of the own terminal (i.e., the videoconference terminal 3a) as a transmission source terminal and the image type information, both of which are stored at step S53 in association with one another. The transmission and reception unit 51 of the communication management system 5 receives the request for addition of the image type information.

Subsequently, the writing and reading unit 59 of the communication management system 5 refers to the session management DB 5001 (see FIG. 21) using the IP address of the transmission source terminal received at step S54 as a search key, to search and read the session ID associated with the IP address (step S55).

Subsequently, the generating unit 56 generates a unique image data ID (step S56). Then, the writing and reading unit 59 stores, in the image type management DB 5002 (see FIG. 22), as a new record, the session ID that is read at step S55, the image data ID generated at step S56, the IP address of the transmission source terminal, and the image type information that are received at step S54, in association with one another (step S57). Then, the transmission and reception unit 51 transmits the image data ID newly generated at step S56 to the videoconference terminal 3a. The transmission and reception unit 31a of the videoconference terminal 3a receives the image data ID (step S58).

Subsequently, the writing and reading unit 39a of the videoconference terminal 3a stores, in the image type management DB 3001a (see FIG. 16), the image data ID received at step S58, in association with the IP address of the own terminal (i.e., the videoconference terminal 3a) as the transmission source terminal and the image type information that are stored at step S53 (step S59).

Further, the transmission and reception unit 51 of the communication management system 5 transmits a notification of addition of the image type information to other communication terminal (i.e., the videoconference terminal 3d in the present embodiment) (step S60). The notification of addition of the image type information includes the image data ID generated at step S56, and the IP address of the own terminal (i.e., the videoconference terminal 3a) as the transmission source terminal and the image type information that are stored at step S53. The transmission and reception unit 31d of the videoconference terminal 3d receives the notification of addition of the image type information. The destination of the notification transmitted by the transmission and reception unit 51 is indicated by an IP address associated with the session ID with which the IP address of the videoconference terminal 3a is associated in the session management DB 5001 (see FIG. 21). Namely, the destination includes one or more other communication terminals that are in the same virtual conference room where the videoconference terminal 3a is participating in.

Then, the writing and reading unit 39*d* of the videoconference terminal 3*d* stores, in the image type management DB 3001*d* (see FIG. 16), as a new record, the image data ID, the IP address of the transmission source terminal, and the image type information, which are received at step S60, in association with one another (step S61). In substantially the same manner, the notification of addition of the image type information is transmitted to the smartphone 9 and the PC 7, which are other communication terminals, and then the smartphone 9 and the PC 7 stores the image type information, etc. in the image type management DB 9001 and the image type management DB 7001, respectively. Through the process described above, the same information is shared among the communication terminals by being stored in the image type management DBs 3001*a*, 3001*d*, 7001 and 9001.

Figure 27:
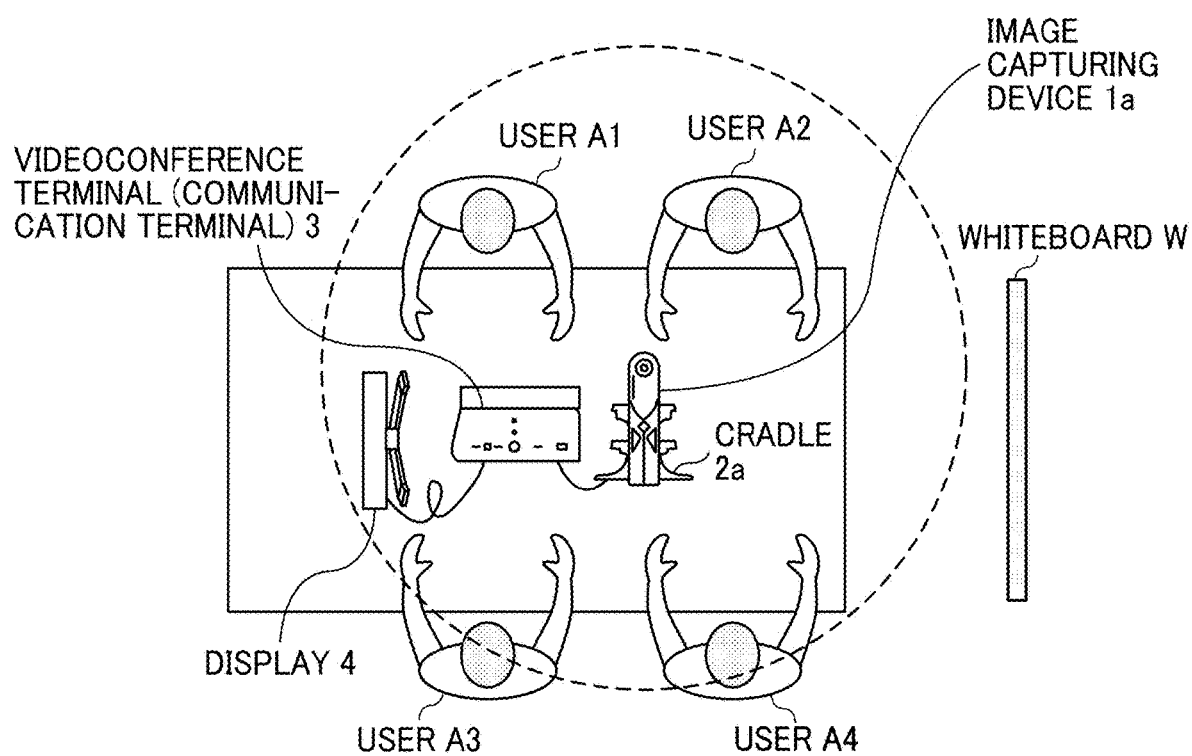
FIG. 27 is illustrations of a state in performing a video communication, according to an embodiment of the present disclosure.

Process of Establishing Communication to Transmit and Receive Captured Image Data A description is now given of a process of communicating captured image data and material image data in video communication according to the present embodiment, with reference to FIG. 27 to FIG. 35. FIG. 27 is an illustration of an example state of video communication performed in the site A.

As illustrated in FIG. 27, the videoconference terminal 3*a* combines a material image generated by the PC 6 with a spherical image captured by the image capturing device 1*a* and displays, on the display 4, the spherical image with which the material image is combined. In addition, a whiteboard W, which is illustrated in the right side of FIG. 27, is provided in the site A, and the users A1 to A4 can write characters or pictures on the whiteboard W.

Figure 28:
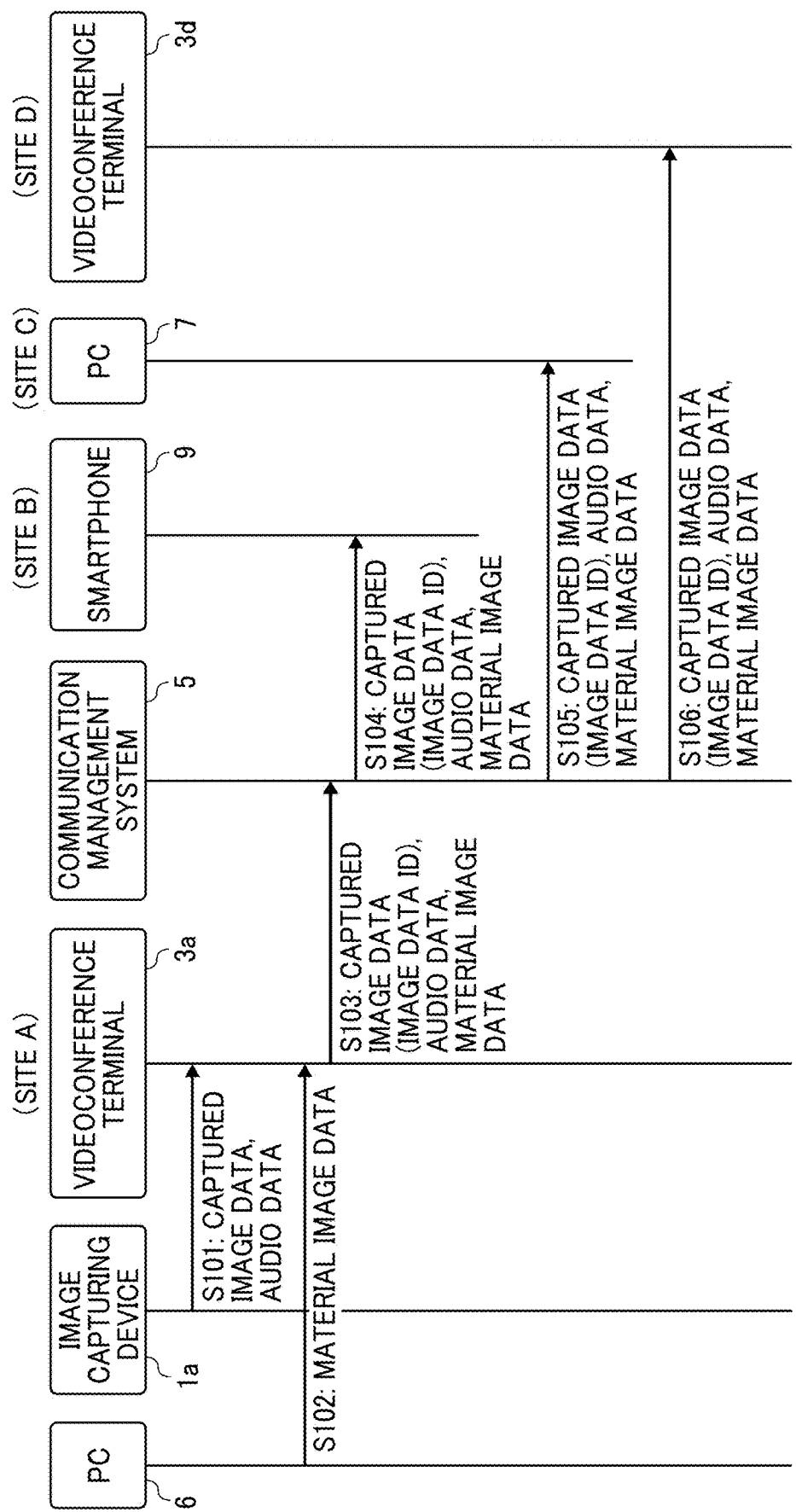
FIG. 28 is a sequence diagram illustrating a process of transmitting captured image data, audio data, and material image data in a video communication, according to an embodiment of the present disclosure.
Figure 29:
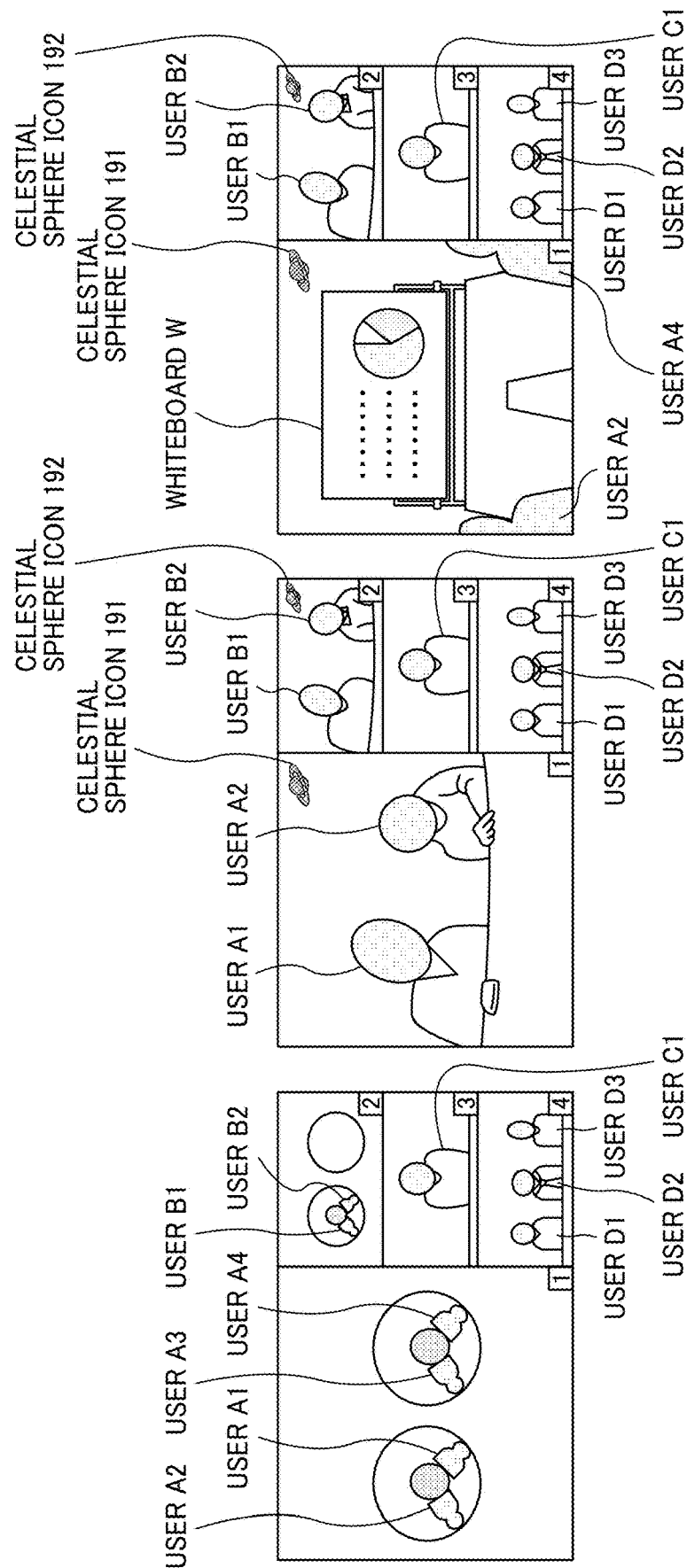
FIG. 29A is an illustration of a screen of a display in one site, in which the display displays images corresponding to captured image data transmitted via the videoconference terminal from other image capturing devices each of which is provided in one of the other sites, without generating a spherical image and a predetermined area image, according to an embodiment of the present disclosure.
FIG. 29B is illustration of another screen of a display in one site, in which the display displays images after a spherical image and a predetermined area image are generated based on image data transmitted from other image capturing devices each of which is provided in one of the other sites, according to an embodiment of the present disclosure.
FIG. 29C is illustration of still another screen of a display in one site, in which a predetermined area image of FIG. 29B is changed, according to an embodiment of the present disclosure.

A description is now given of a process of transmitting captured image data, audio data, and material image data obtained in the site A illustrated in FIG. 27 to each of other communication terminals (i.e., the smartphone 9, the PC 7, and the videoconference terminal 3*d*) via the communication management system 5, according to the present embodiment, with reference to FIG. 28. FIG. 28 is a sequence diagram illustrating the process of transmitting captured image data, audio data, and material image data in the video communication, according to the present embodiment.

The communication unit 18*a* of the image capturing device 1*a* transmits captured image data obtained by capturing an object or surrounding and audio data obtained by collecting sounds to the communication unit 38*a* of the videoconference terminal 3*a* (step S101). Because the image capturing device 1*a* is a device that is capable of obtaining two hemispherical images, from which a spherical image is generated, the captured image data is configured by data of the two hemispherical images as illustrated in FIG. 3A and FIG. 3B. The communication unit 38*a* of the videoconference terminal 3*a* receives the captured image data and the audio data.

Subsequently, the communication unit 68 of the PC 6 transmits the material image data displayed by the display control unit 64 to the communication unit 38*a* of the videoconference terminal 3*a* (step S102).

Subsequently, the transmission and reception unit 31*a* of the videoconference terminal 3*a* transmits, to the communication management system 5, the captured image data, the audio data, and the material image data received from the image capturing device 1*a* (step S103). The transmission and reception unit 51 of the communication management system 5 receives the captured image data, the audio data, and the material image data. In step S103, along with the captured image data, an image data ID identifying the captured image data, which is a transmission target, is also transmitted.

Subsequently, the transmission and reception unit 51 of the communication management system 5 transmits the captured image data, the audio data, and the material image data to each of other participant communication terminals (i.e., the smartphone 9, the PC 7, and the videoconference terminal 3*d*) participating in the same video communication in which the videoconference terminal 3*a* is participating (steps S104, S105, S106). At each of these steps, along with the captured image data, the image data ID identifying the captured image data, which is a transmission target, is also transmitted. Accordingly, each of the transmission and reception unit 91 of the smartphone 9, the transmission and reception unit 71 of the PC 7 and the transmission and reception unit 31*d* of the videoconference terminal 3*d* receives the captured image data and the image data ID, and further receives the audio data and the material image data.

A description is now given of examples of a screen of the display 917 in the site B, according to the present embodiment with reference to FIG. 29A, FIG. 29B and FIG. 29C. Each of FIG. 29A, FIG. 29B, and FIG. 29C is an illustration of an example of a screen displayed on the display 917 in the site B, according to the present embodiment. FIG. 29A is an illustration of a screen displayed in the site B, in which the screen includes an image based on captured image data transmitted from the image capturing device 1*a* in the site A via the videoconference terminal 3*a*, and another image based on captured image data transmitted from the image capturing device 1*b* in the site B, without generating a spherical image and a predetermined area image. On the other hand, FIG. 29B is an illustration of a screen displayed in the site B, in which the screen includes images that are displayed after a spherical image and a predetermined area image are generated based on the captured image data transmitted from the image capturing device 1*a* in the site A and the image capturing device 1*b* in the site B. In the example of FIG. 29A to FIG. 29C, an image of the site A is displayed in a left-side display area (layout number "1") of the display 4*d*, and an image of the site B is displayed in an upper-right display area (layout number "2"). Further, in a middle-right display area (layout number "3") of the display 4*d*, an image of the site C is displayed, and an image of the site D (own site) is displayed in a lower-right display area (layout number "4"). The display area having the layout number "1" is a main display area, and the display areas with the layout numbers "2", "3" and "4" are sub display areas. The image in the main display area and the image in the sub display area can be changed in each communication terminal. In general, an image in which a main person in the video communication is included is displayed in the main display area at each site.

When images of the captured image data transmitted from the image capturing device 1*a* and the image capturing device 1*b*, each of which captures a spherical image, are displayed as they are, the images of the site A and the site B are displayed as illustrated in FIG. 29A, i.e., each image is displayed as a combination of a hemispherical image on the front side and a hemispherical image on the back side, as respectively illustrated in FIG. 3A and FIG. 3B.

On the other hand, when the image and audio processing unit 93 generates a spherical image based on the captured image data output from the image capturing device 1*a* and the image capturing device 1*b*, each of which obtains two hemispherical images from which a spherical image is generated, and further generates a predetermined area image, the predetermined area image, which is a planar image, is displayed as illustrated in FIG. 29B. Further, in both of FIG. 29A and FIG. 29B, a general image (planar image in the present embodiment) is displayed in each of the display areas of the site C and site D, because the image capturing device 8 and the camera 312 built in the videoconference terminal 3d, each of which is an image capturing device that obtains a general image, are used in the site C and the site D, respectively.

Furthermore, a user is able to change the predetermined area corresponding to the predetermined area image in the same spherical image. For example, when the user B1 operates the touch panel 921, the receiving unit 92 receives a user operation to shift the predetermined area image, and the display control unit 94 shifts, rotates, reduces, or enlarges the predetermined area image. Thereby, a default predetermined area image in which the user A1 and the user A2 are displayed as illustrated in FIG. 29B, is changeable to another predetermined area image as illustrated in FIG. 29C, for example. More specifically, in FIG. 29C, the predetermined area image is changed from one including the users A1 and A2 to another one including the whiteboard W, in the captured image of the site A as illustrated in FIG. 27.

Note that celestial sphere icons 191 and 192 illustrated in FIGS. 29B and 29C are examples of a special image identification icon indicating that an image being displayed is a predetermined area image corresponding to the predetermined area T, which is a part of a spherical image. The celestial sphere icons 191 and 192 are displayed in an upper right corner in the examples of FIG. 28B and FIG. 28C, however the disclosure is not limited to this and the celestial sphere icons 191 and 192 may be displayed at anywhere, for example in an upper left corner, a lower left corner, or a lower right corner, instead of at the upper right. In addition, a type of each of the celestial sphere icons 191 and 192 is not limited to the one illustrated in FIG. 29B and FIG. 29C. For example, in alternative to or in addition to the celestial sphere icons 191 and 192, a character string such as "Spherical Image", or a combination of the icon and the character string may be used.

Figure 30:
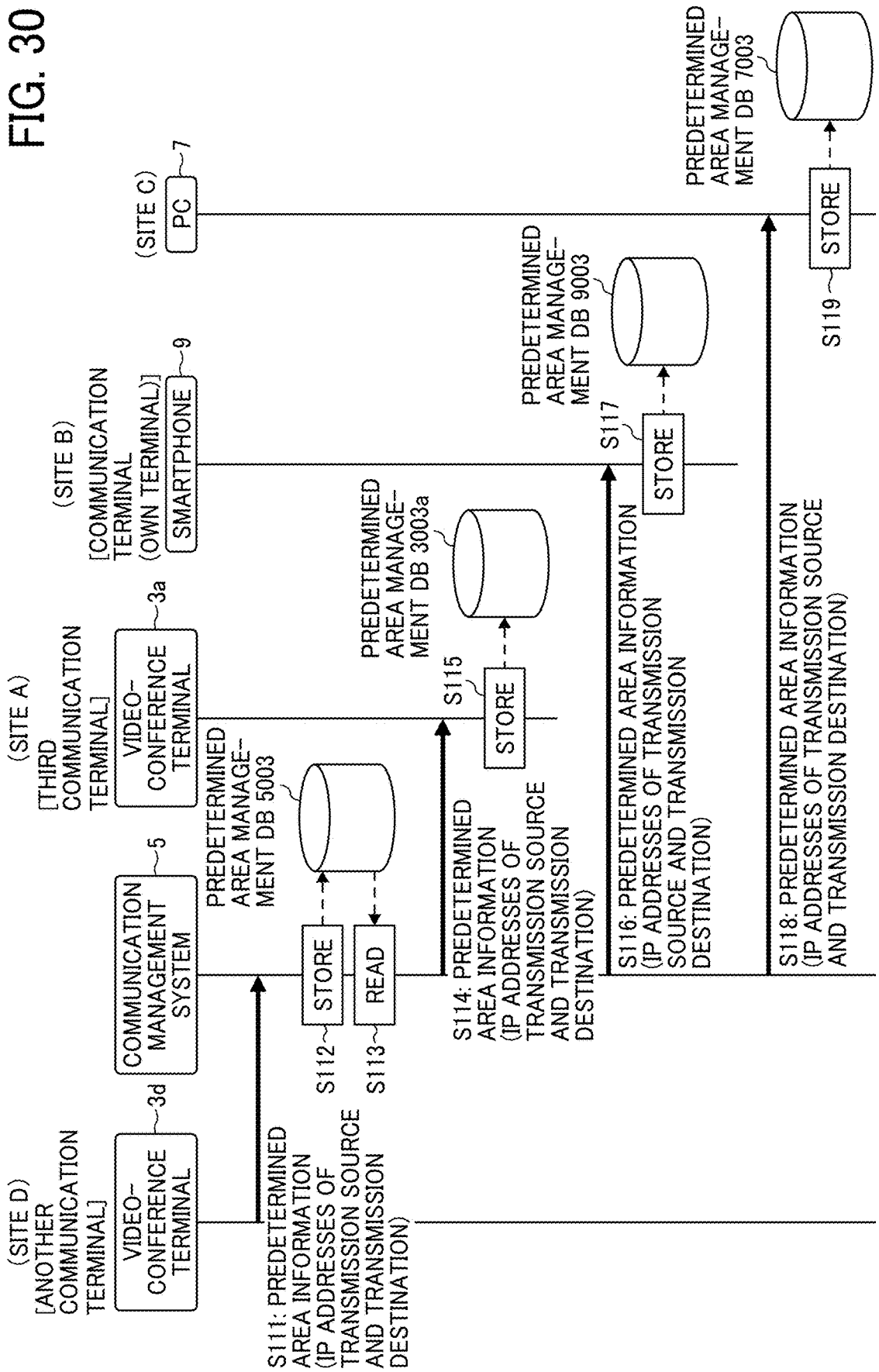
FIG. 30 is a sequence diagram illustrating a process of sharing predetermined area information, according to an embodiment of the present disclosure.

A description is now given of a process performed by the image communication system, when a predetermined area image as illustrated in FIG. 29B is displayed and the predetermined area image is changed from the one illustrated in FIG. 29B to another one illustrated in FIG. 29C, according to the present embodiment, with reference to FIG. 30. FIG. 30 is a sequence diagram illustrating a process of sharing predetermined area information. In FIG. 30, the videoconference terminal 3a in the site A is an example of a third communication terminal, the videoconference terminal 3d in the site D is an example of another communication terminal, and the smartphone 9 in the site B is an example of the communication terminal (own terminal).

First, when the user D1, D2 or D3 operates the videoconference terminal 3d in the site D to display the predetermined area image of the site A as illustrated in FIG. 29B, the transmission and reception unit 31d of the videoconference terminal 3d transmits, to the communication management system 5, predetermined area information indicating the predetermined area image currently being displayed (step S111). This predetermined area information includes the IP address of the videoconference terminal 3a, which is a transmission source terminal of the captured image data, and the IP address of the videoconference terminal 3d, which is a transmission destination terminal of the captured image data. In this example, the videoconference terminal 3d is also a transmission source terminal of the predetermined area information. The transmission and reception unit 51 of the communication management system 5 receives the predetermined area information.

The writing and reading unit 59 of the communication management system 5 stores, in the predetermined area management DB 5003, the predetermined area information and the IP address of the transmission source terminal and the IP address of the transmission destination terminal, which are received at step S111, in association with one another (step S112). The processing of step S111 and step S112 is performed each time when the predetermined area image is changed in the videoconference terminal 3d, for example, from the one as illustrated in FIG. 29B to another one as illustrated in FIG. 29C.

The writing and reading unit 59 of the communication management system 5 reads out, from a plurality of sets of the predetermined area information and the IP addresses of the transmission source terminal and the transmission destination terminal stored in the predetermined area management DB 5003, the latest (the most recently stored) set of predetermined area information and the IP addresses of the transmission source terminal and the transmission destination terminal, at preset intervals such as every thirty seconds (step S113). Next, the transmission and reception unit 51 distributes (transmits) the predetermined area information including the IP addresses read at step S113, to other communication terminals (i.e., the videoconference terminal 3a, the smartphone 9, and the PC 7) participating in the same video communication in which the videoconference terminal 3d, which is the transmission source terminal of the predetermined area information, is participating (steps S114, S116, S118). The videoconference terminal 3a receives the predetermined area information and the IP addresses at the transmission and reception unit 31a. The writing and reading unit 39a stores the predetermined area information and the IP addresses received at step S114 in association with one another in the predetermined area management DB 3003a (FIG. 18) (step S115). In substantially the same manner, the transmission and reception unit 91 of the smartphone 9 receives the predetermined area information and the IP addresses. Then, the writing and reading unit 99 stores the predetermined area information and the IP addresses received at step S116 in association with one another in the predetermined area management DB 9003 (FIG. 18) (step S117). Further, the transmission and reception unit 71 of the PC 7 receives the predetermined area information and the IP addresses. The writing and reading unit 79 stores, in the predetermined area management DB 7003 (FIG. 18), the predetermined area information received at step S118 in association with the IP addresses that are also received at step S118 (step S119).

Figure 31:
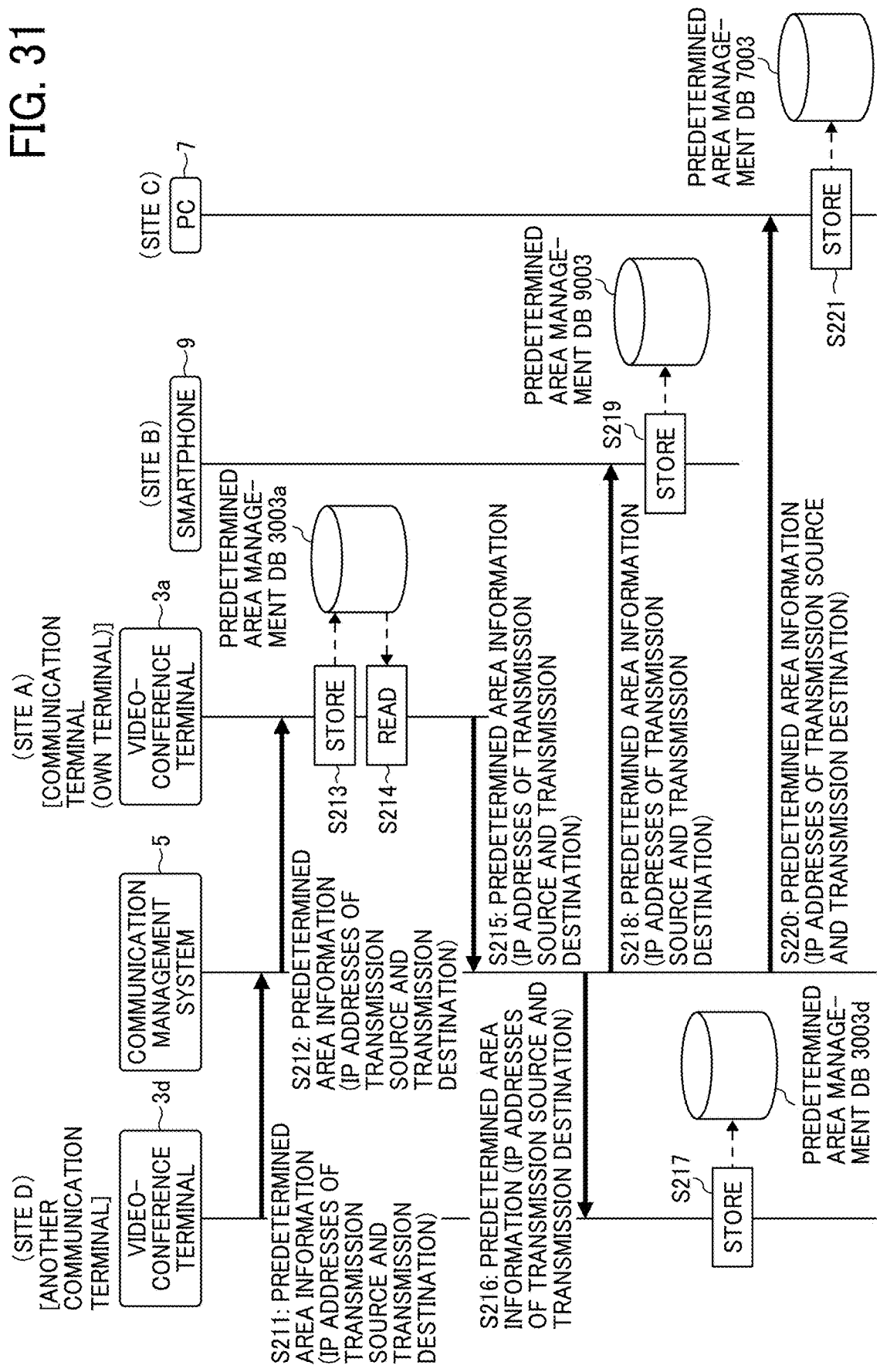
FIG. 31 is a sequence diagram illustrating another process of sharing predetermined area information, according to an embodiment of the present disclosure.

A description is now given of another process of sharing predetermined area information according to the present embodiment, with reference to FIG. 31. FIG. 31 is a sequence diagram illustrating another example of the process of sharing predetermined area information described above, with reference to FIG. 30. In FIG. 31, the videoconference terminal 3a in the site A is an example of a communication terminal (own terminal), and the videoconference terminal 3d in the site D is an example of another communication terminal.

In the process described above with reference to FIG. 30, the communication management system 5 once stores predetermined area information transmitted from any one of the communication terminals (see step S112) and transmits the predetermined area information at regular intervals to each of the other communication terminals other than the communication terminal that transmits the predetermined area information (see steps S114 to S119). By contrast, in the process illustrated in FIG. 32, not the communication management system 5 but any one of the communication terminals (the videoconference terminal 3a, in this example) as a transmission source terminal of captured image data once stores predetermined area information (see step S213), and transmits the predetermined area information to each of the other communication terminals than the own terminal (i.e., the videoconference terminal 3a) at regular intervals (see steps S215 to S221). In other words, according to the present embodiment, a communication terminal as a transmission source of captured image data manages how a predetermined area image representing the predetermined area T1 is displayed by another communication terminal based on the captured image data transmitted from the own terminal (i.e., the videoconference terminal 3a, in the embodiment).

The operation illustrated in FIG. 31 is implemented by a common hardware configuration that implements the operation illustrated in FIG. 30. Therefore, a description of a hardware configuration for implementing the operation illustrated in FIG. 31 is omitted.

In the operation illustrated in FIG. 31, firstly, when the user D1, D2 or D3 operates the videoconference terminal 3d in the site D to display a predetermined area image of the site A, the transmission and reception unit 31d of the videoconference terminal 3d transmits, to the communication management system 5, predetermined area information indicating the predetermined area image currently being displayed (step S211). This predetermined area information includes the IP address of the videoconference terminal 3a, which is a transmission source terminal of the captured image data, and the IP address of the videoconference terminal 3d, which is a transmission destination terminal of the captured image data. In this example, the videoconference terminal 3d is also a transmission source terminal of the predetermined area information. The transmission and reception unit 51 of the communication management system 5 receives the predetermined area information.

Next, the transmission and reception unit 51 of the communication management system 5 transmits the predetermined area information including the IP addresses received at step S211 to the videoconference terminal 3a, which is a transmission source terminal of the captured image data (step S212). The videoconference terminal 3a receives the predetermined area information and the IP addresses at the transmission and reception unit 31a.

Next, the writing and reading unit 39a of the videoconference terminal 3a stores, in the predetermined area management DB 3003a, the predetermined area information, the IP address of the transmission source terminal and the IP address of the transmission destination terminal, which are received at step S212, in association with one another (step S213). This processing of S213 is a process of managing how the captured image data transmitted from the own terminal (i.e., the videoconference terminal 3a, in this example) is displayed in each of the other communication terminals. The processing of S211 to S213 is performed each time the predetermined area image is changed in the videoconference terminal 3d.

The writing and reading unit 39a of the videoconference terminal 3a reads out, from a plurality of sets of the predetermined area information and the IP address of each of the transmission source terminal and the transmission destination terminal stored in the predetermined area management DB 3003a, the latest (the most recently stored) set of predetermined area information and the IP address of each of the transmission source terminal and the transmission destination terminal, at preset intervals such as every thirty seconds (step S214). Then, the transmission and reception unit 31a transmits the predetermined area information including the IP addresses read out at step S214 to the communication management system 5 (step S215). The transmission and reception unit 51 of the communication management system 5 receives the predetermined area information.

Next, the transmission and reception unit 51 of the communication management system 5 transmits (distributes) the predetermined area information including the IP addresses received at step S215 to each of the communication terminals (i.e., the videoconference terminal 3d, the smartphone 9, the PC 7) (steps S216, S218, S220). The videoconference terminal 3d receives the predetermined area information including the IP addresses at the transmission and reception unit 31d. The writing and reading unit 39d stores, in the predetermined area management DB 3003d, the predetermined area information received at step S216 in association with the IP addresses that are also received at step S216 (step S217). In substantially the same manner, the transmission and reception unit 91 of the smartphone 9 receives the predetermined area information and the IP addresses. Then, the writing and reading unit 99 stores, in the predetermined area management DB 9003, the predetermined area information received at step S218 in association with the IP addresses that are also received at step S218 (step S219). Further, the transmission and reception unit 71 of the PC 7 receives the predetermined area information and the IP addresses. The writing and reading unit 79 stores, in the predetermined area management DB 7003, the predetermined area information received at step S220 in association with the IP addresses that are also received at step S220 (step S221).

Thus, the predetermined area information indicating the predetermined area image changed in the site A is transmitted to each of the communication terminals in the other sites B, C and D participating in the same video communication. As a result, the predetermined area information indicating the predetermined area image being displayed in the site A is shared by the other communication terminals in the other sites B, C and D. This operation is performed in substantially the same manner, when the predetermined area image being displayed at any one of the communication terminals in the sites B, C, and D is changed. Accordingly, the predetermined area information indicating the predetermined area image being displayed by the communication terminal in any one of the sites is shared by the other communication terminals in the other sites which are participating in the same video communication.

Figure 32:
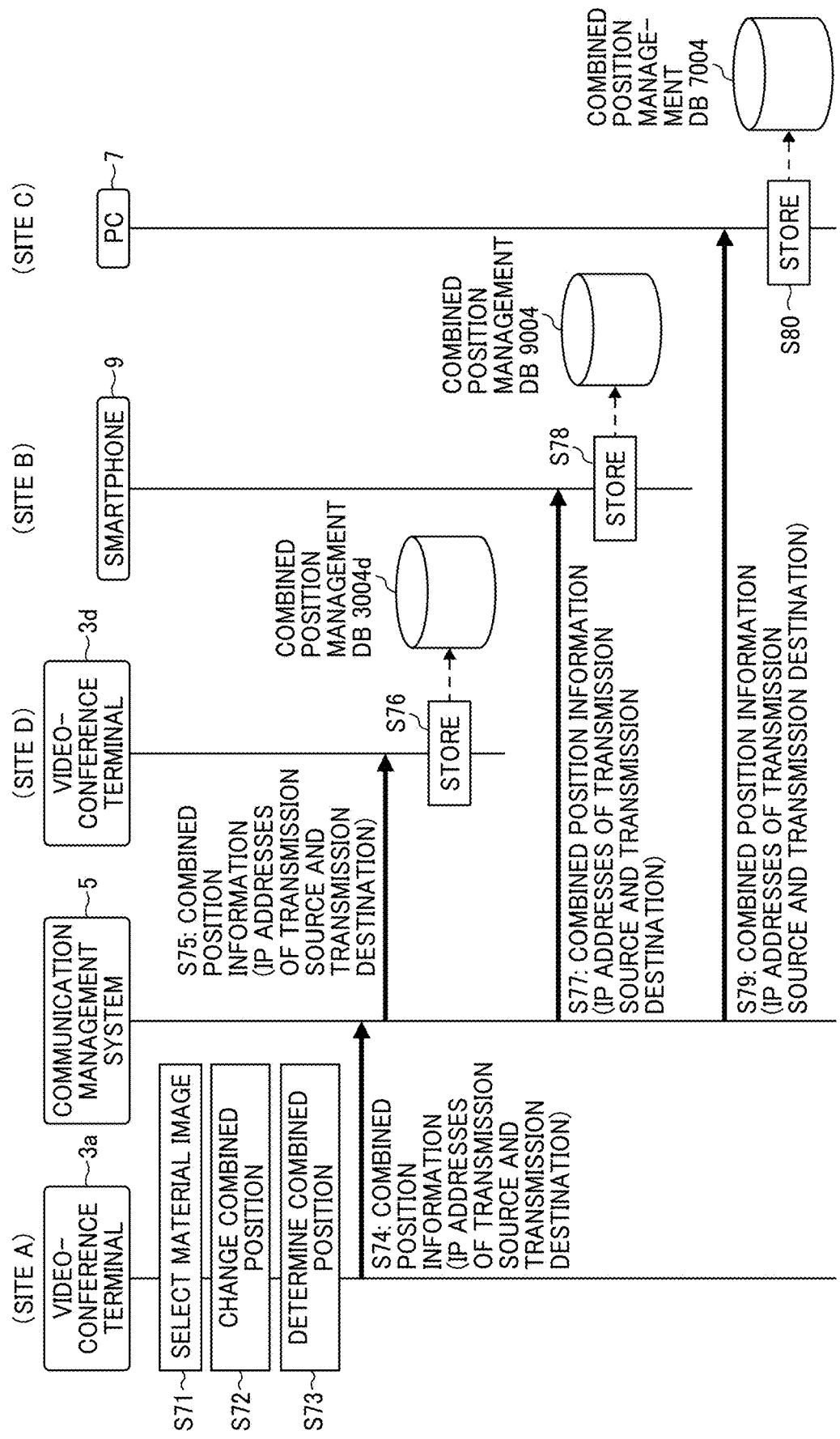
FIG. 32 is a sequence diagram illustrating a process of sharing combined position information, according to an embodiment of the present disclosure.

Referring now to FIG. 32 to FIG. 35, a description is given of setting of a combined position of a material image. FIG. 32 is a sequence diagram illustrating an operation performed by the image communication system. More specifically, FIG. 32 is a sequence diagram illustrating an operation performed when the videoconference terminal 3a, which is a transmission source of an image and provided in the site A, changes a combined position at which a material image is to be combined with a spherical image.

The receiving unit 32a receives selection of a material image according to an operation by the user A1, A2, A3 or A4 in the site A (step S71). For example, the user A1, A2, A3 or A4 selects the material image by right clicking, double clicking, or pressing a corresponding key on a portion of the material image displayed on a preview screen of the spherical image being distributed from the videoconference terminal 3*a*. In a case where a terminal including a touch panel as an input device is used, the user can select the material image by long tapping or double tapping the material image displayed in the preview screen. Subsequently, the receiving unit 32*a* receives a change of a combined position of the material image according to an operation by the user A1, A2, A3 or A4 (step S72).

Then, the receiving unit 32*a* receives determination of the combined position of the material image according to an operation by the user A1, A2, A3 or A4, and the computing unit 37*a* generates combined position information (step S73). For example, the receiving unit 32*a* accepts that the combined position is determined automatically after the operation at step S72. In another example, the receiving unit 32*a* accepts the determination of the combined position according to the user operation of an "Enter" button on the screen or pressing a preset key.

Figure 33:
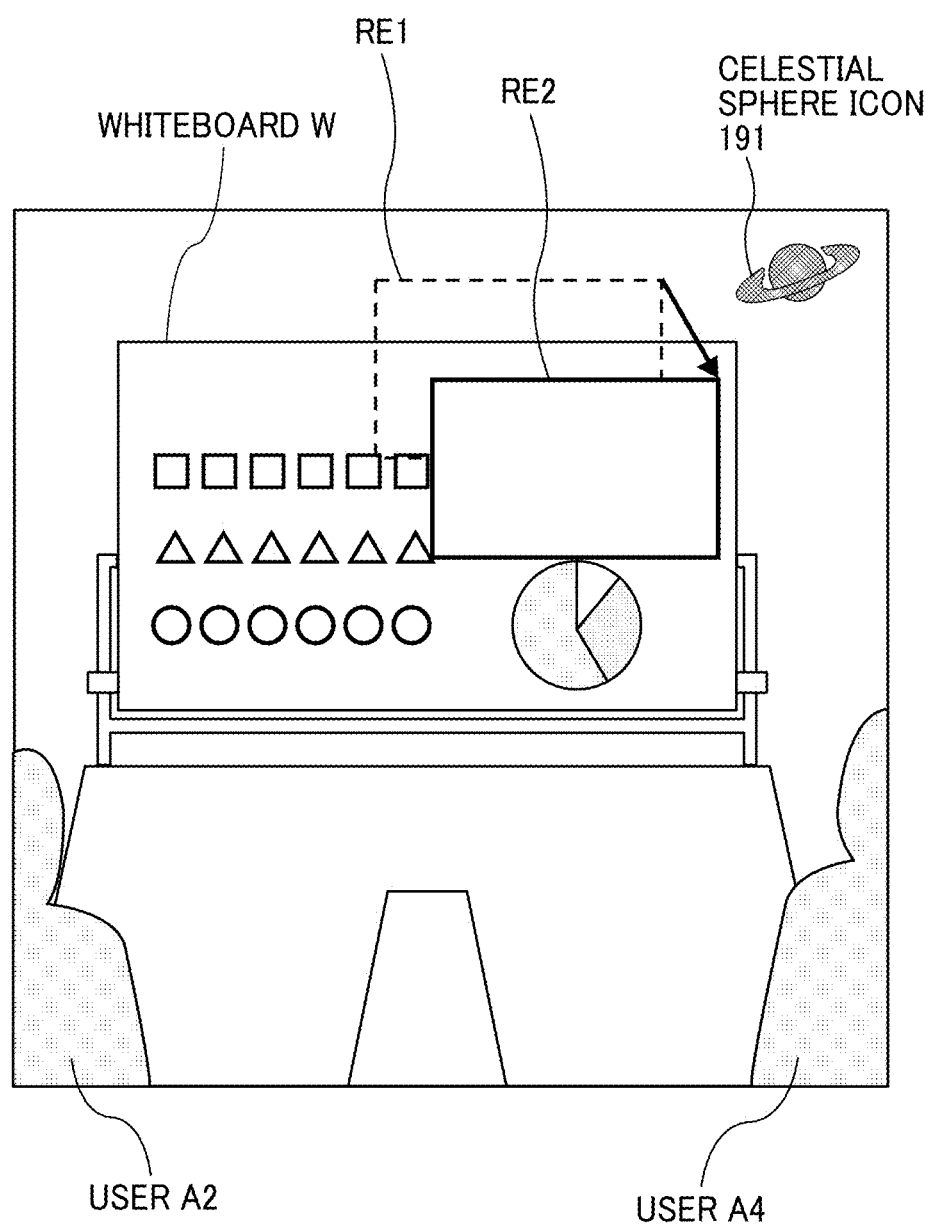
FIG. 33 is an illustration of a screen for changing a combined position, according to an embodiment of the present disclosure.

A description is now given of an example of a screen displayed when the user A1, A2, A3 or A4 changes the combined position of the material image, with reference to FIG. 33. FIG. 33 is an illustration of an example of a preview screen of a spherical image in the site A, according to the present embodiment. The preview screen is a screen that is used for confirming, at its own site, a video image distributed by a certain site without using the communication network 100. As illustrated in FIG. 33, the preview screen displays the user A2, the user A4, and the whiteboard W out of the spherical image. Characters and pie chart are written on the whiteboard W.

Referring to FIG. 33, the preview screen also displays a region RE1 surrounded by a dotted line and a region RE2 surrounded by a solid line. Region RE1 and region RE2 respectively indicate the combined position before the change and the combined position after the change. By changing the combined position of the material image from the region RE1 to the region RE2, which is within an area of the whiteboard W, the bar graph, which is the material image displayed by the PC 6, is displayed next to or close to the characters and the pie chart written on the whiteboard W, it becomes more eye-friendly for the participants in the conference.

A description is now given of an operation, in correspondence to the above-described steps S71 to S73, of the user A1, A2, A3 or A4, with reference to FIG. 33. The user A1, A2, A3 or A4 selects the region RE1 (step S71), and then drags and drops in a direction of the arrows to change the combined position of the material image (step S72). Then, the user A1, A2, A3 or A4 operates for determining the combined position after the change while the combined position is kept as the region RE2, which is a position desired by the user A1, A2, A3 or A4 (step S73).

The method of changing the combined position is not limited to the "drag and drop" described with reference to FIG. 33. In another example, the combined position is changed by changing coordinates of a start point and an end point of an image to be combined through a predetermined key operation. In still another example, the combined position is changed by pinch in operation or pinch out operation when the device is capable of receiving a touch input. In addition, when a size of the material image varies before and after the change, that is, the size of the region RE1 and the size of the region RE2 are different from each other, the enlargement or reduction may be performed so as to fit within the changed size. Further, the frame of the dotted line indicating the region RE1 or the arrows may be displayed for assisting the user's operation or may not be displayed.

Referring to FIG. 32, the communication unit 68 transmits, to the transmission and reception unit 51 of the communication management system 5, the combined position information after the change (step S74). This combined position information includes combined position coordinates, the IP address of the videoconference terminal 3*a*, which is a transmission source terminal of the captured image data, and the IP address of the videoconference terminal 3*d*, which is a transmission destination terminal of the captured image data. In this example, the videoconference terminal 3*d* is also a transmission source terminal of the combined position information. The transmission and reception unit 51 of the communication management system 5 receives the combined position information, accordingly.

Next, the transmission and reception unit 51 distributes (transmits) the combined position information to other communication terminals (the videoconference terminal 3*a*, the smartphone 9, the PC 7) participating in the same video communication in which the videoconference terminal 3*d*, which is the transmission source terminal of the predetermined area information, is participating (steps S75, S77, S79). The videoconference terminal 3*d* receives the combined position information including the IP addresses at the transmission and reception unit 31*d*. Then, the writing and reading unit 39*a* stores the combined position information received at step S75 in the combined position management DB 3004*d* in association with the transmission source address (step S76). In substantially the same manner, the transmission and reception unit 91 of the smartphone 9 receives the combined position information and the IP addresses. Then, the writing and reading unit 99 stores the combined position information received at step S77 in the combined position management DB 9004 in association with the transmission source address (step S78). Further, the transmission and reception unit 71 of the PC 7 receives the combined position information and the IP addresses. The writing and reading unit 79 stores, in the combined position management DB 7004, the combined position information received at step S79 in association with the IP addresses that are also received at step S79 (step S80).

Figure 34:
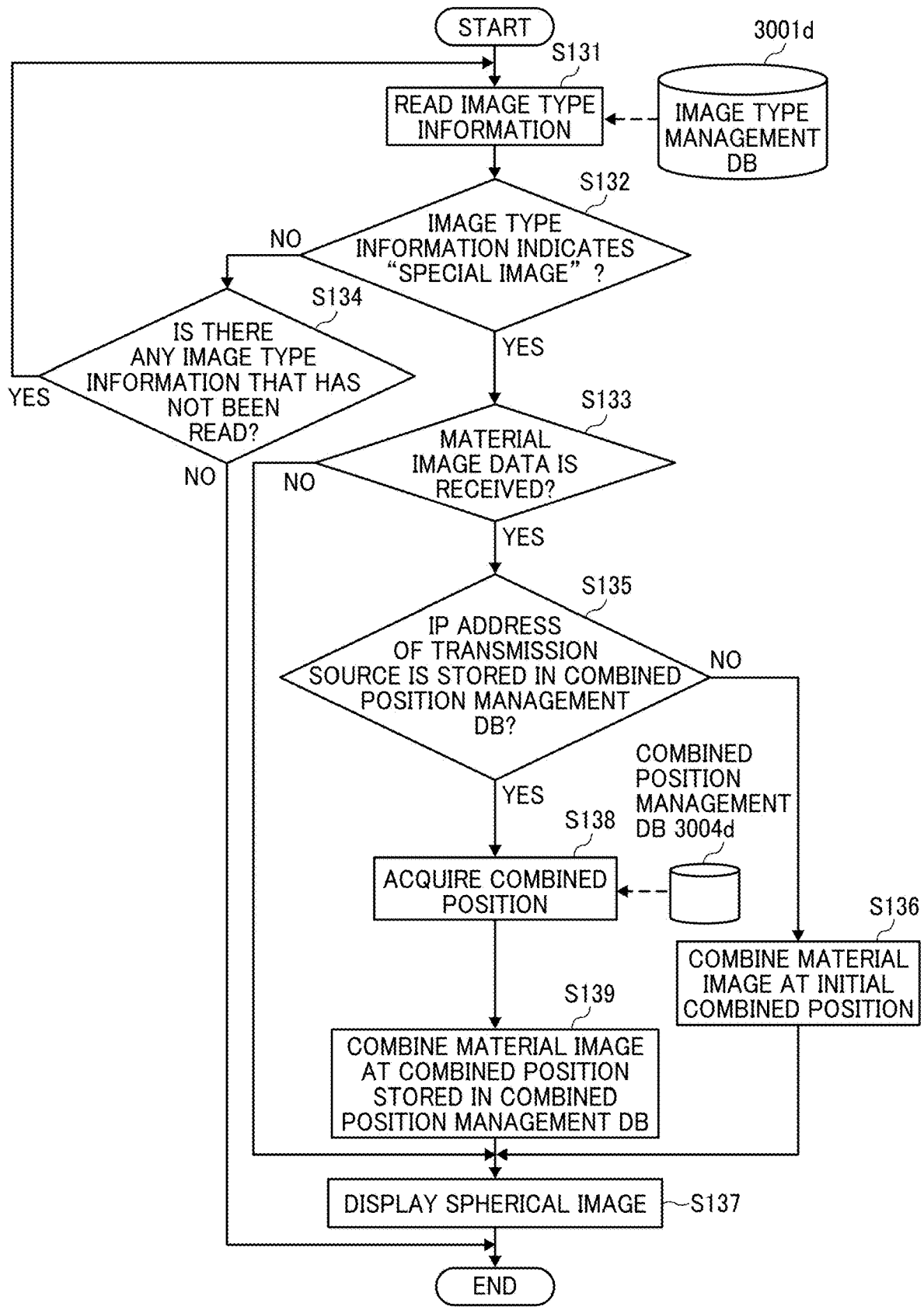
FIG. 34 is a flowchart illustrating a process of displaying a combined image, according to an embodiment of the present disclosure.

FIG. 34 is a flowchart illustrating a process of displaying a material image at a side of a receiver terminal, according to the present embodiment. Since the same or the substantially the same operation is performed at each of the receiver terminals (i.e., the smartphone 9, the PC 7, the videoconference terminal 3*a*, and the videoconference terminal 3*d*), an operation performed by the smartphone 9 in the site B is described, as an example.

First, the writing and reading unit 99 of the smartphone 9 searches the image type management DB 9001 (see FIG. 16) using the image data ID received in step S106 in the process illustrated in FIG. 28 as a search key, to read out the image type information (source name) associated with the image data ID (step S131).

Next, the determination unit 95 determines whether the image type information read at step S131 indicates "special image" or not (step S132). Furthermore, when the determination result of step S132 is a special image, the determination unit 95 checks, or determines, whether material image data is received or not (step S133). On the other hand, when the determination result of step S132 is not a special image (NO at step S132), the process proceeds to step S134, and a determination whether there is image type information that has not been read yet. In step S134, there is no image type information, which has not been read, (NO at step S134), the process ends, and there is image type information, which has not been read, (YES at step S134), the process returns to step S131. In step S133, for example, when there is image data that is not managed by an image data ID, the image data is determined to be the material image data. When the determination result of step S133 indicates that the material image data is not received, that is, if No at step S133, the image and audio processing unit 93 displays the spherical image (step S137), and the process ends. On the other hand, when the determination result of step 133 indicates that the material image data is received, that is, if Yes at step S133, the determination unit 95 determines whether the transmission source IP address of the image information is stored in the combined position management DB 9004d or not (step S135). When the determination result of step S135 indicates that the transmission source IP address is not stored, that is, if No at step S135, the image and audio processing unit 93 combines the material image data with the spherical image at an initial combined position (default combined position) that is a predetermined combined position on the spherical image (step S136). Then, the spherical image is displayed (step S137). When the determination result of step S135 indicates that the transmission source IP address is stored, that is, if Yes at step S135, the writing and reading unit 99 acquires the combined position from the combined position management DB 9004d (step S138). Subsequently, the image and audio processing unit 93 combines the material image data with the spherical image at the combined position acquired (step S139) and displays the spherical image (step S137).

Figure 35:
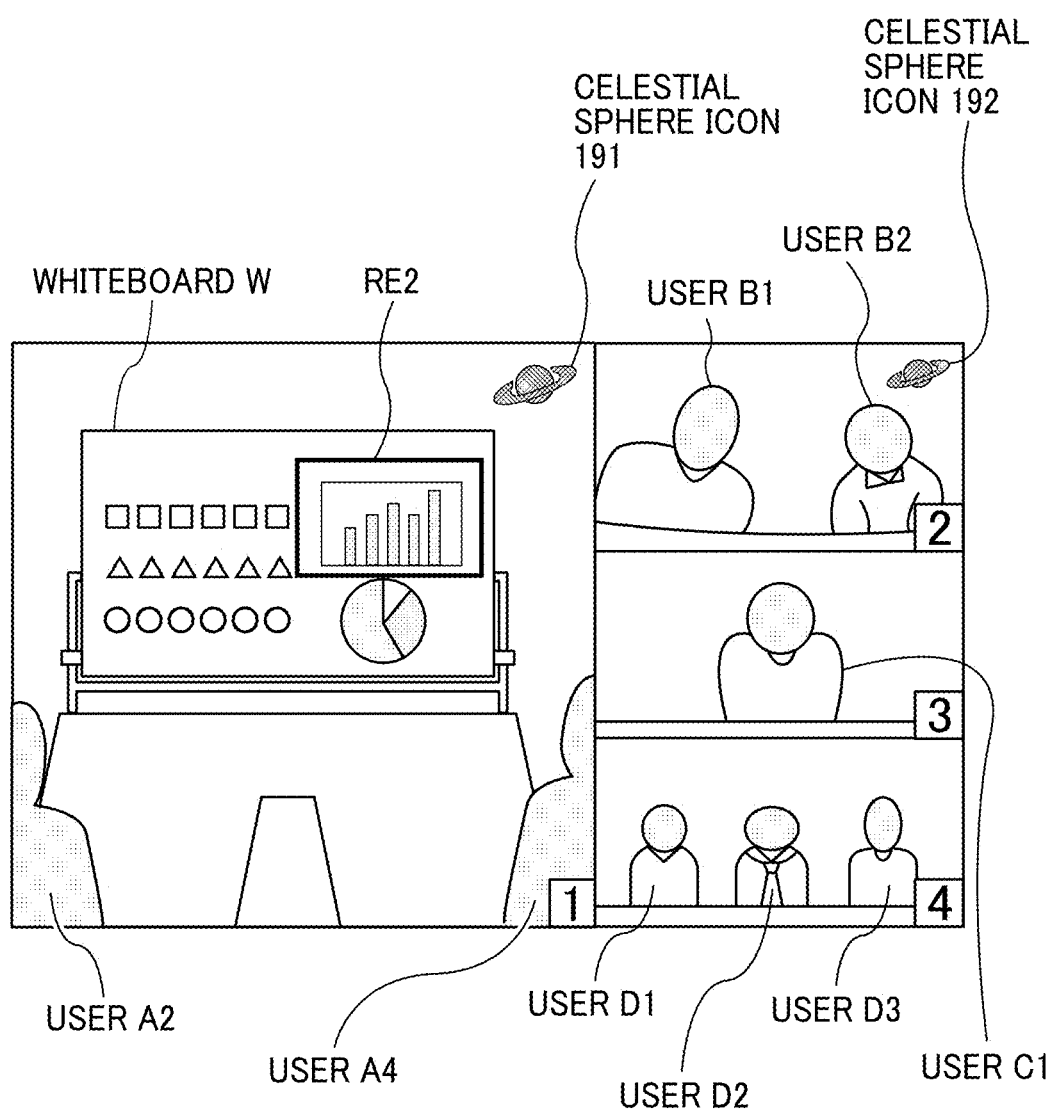
FIG. 35 is an illustration of a display displaying a combined image at a site, according to an embodiment of the present disclosure.

FIG. 35 is an example of a display screen displayed at the site B at which the display process described with reference to FIG. 34 is performed. As illustrated in FIG. 35, at the site B, the combined image is displayed in the region RE2 which is the combined position obtained by changing the combined image at the site A in FIG. 33.

Thus, the combined position information changed in the site A is transmitted to each of the communication terminals in the other sites B, C and D participating in the same video communication. As a result, the material image being displayed in the site A is also displayed by the other communication terminals in the other sites B, C and D to be shared.

As described heretofore, the communication terminal, such as the videoconference terminal 3a, according to one or more of the embodiments, generates a spherical image and a predetermined area image based on image type information associated with the image data ID transmitted with image data.

This prevents the front-side hemispherical image and the back-side hemispherical image from being displayed as illustrated in FIG. 27A.

Further, according to the present embodiment, in a conference system or the like in which a transmission destination terminal combines a part of the certain image (combination destination image) and display another image (combination source image), a transmission source terminal can change a position of displaying the combination source image according to a user operation. Therefore, the embodiment described above can provide eye-friendly and easy understanding image in a case where a combination source image is combined at a position that is not intended by a user of the transmission source terminal, or in a case where a user desires to combine the image at a different position during a conference, by changing the combined position.

In the above embodiments, a captured image (whole image) is a three-dimensional spherical image, as an example of a panoramic image, which is a destination to be combined. In another example, the captured image is a two-dimensional panoramic image. In addition, in this disclosure, the spherical image does not have to be a full-view spherical image. For example, the spherical image can be a wide-angle view image having an angle of about 180 to any amount less than 360 degrees in the horizontal direction. It is desirable that the spherical image is image data having at least a part that is not entirely displayed in the predetermined area.

Further, the spherical image or any other image being captured, if desired, can be made up of multiple pieces of image data which have been captured through different lenses, or using different image sensors, or at different times.

Further, In the above-described embodiments, the communication management system 5 transfers the predetermined area information transmitted from each communication terminal. In another example, each communication terminal can directly transmit or receive the predetermined area information from or to any one or more of the other communication terminals.

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image communication system, comprising:
a first communication terminal including first circuitry; and
a second communication terminal including second circuitry,
the first circuitry of the first communication terminal being configured to
transmit, to the second communication terminal, first image data representing a first image and second image data representing a second image, and
transmit, to the second communication terminal, position information indicating a predetermined position on the first image, the position information being information of the predetermined position on the first image represented by the first image data and at which the second image represented by the second image data is combined, and the second circuitry of the second communication terminal being configured to combine, based on the position information, the second image represented by the second image data received from the first communication terminal with the first image represented by the first image data received from the first communication terminal on the first image to generate a combined image, and display, on a display, the combined image.

2. The image communication system of claim 1, wherein the first image data is captured image data, and the second image data is material image data.

3. A communication terminal comprising circuitry configured to:

communicate with another communication terminal to transmit, to the another communication terminal, first image data representing a first image and second image data representing a second image;

receive, according to a user input, an operation of setting a position at which the second image is to be combined with the first image, the position being set on the first image; and transmit, to the another communication terminal, position information indicating the position set by the operation of setting, the first image data, and the second image data.

4. The communication terminal of claim 3, wherein, the first image data is captured image data, and the second image data is material image data.

5. A display control method, comprising:

receiving first image data representing a first image and second image data representing a second image;

receiving position information indicating a predetermined position on the first image, the position information being information of the predetermined position of the first image represented by the first image data and at which the second image represented by the second image data is combined;

combining, based on the position information, the second image represented by the second image with the first image represented by the first image to generate a combined image; and displaying, on a display, the combined image.

6. A communication terminal, comprising:

circuitry configured to:

receive, from another communication terminal, first image data representing a first image and second image data representing a second image;

receive, from the another communication terminal, position information indicating a predetermined position on the first image, the position information being information of the predetermined position on the first image represented by the first image data and at which the second image represented by the second image data is combined;

combine, based on the position information, the second image represented by the second image data received from the first communication terminal with the first image represented by the first image data received from the first communication terminal, at the predetermined position on the first image to generate a combined image; and display, on a display, the combined image.

7. The image communication system of claim 6, wherein:

the first image data is captured image data and the second image data is material image data.

8. An information processing method, comprising:

transmitting first image data representing a first image and second image data representing a second image;

receiving, according to a user input, an operation of setting a position at which the second image is to be combined with the first image, the position being set on the first image; and transmitting position information indicating the position set by the operation of setting, the first image data, and the second image data.

* * * * *